United States Patent
Choi et al.

(10) Patent No.: US 9,491,701 B2
(45) Date of Patent: Nov. 8, 2016

(54) METHOD FOR TRANSMITTING AND RECEIVING SIGNAL OF STATION OPERABLE IN POWER SAVING MODE IN WIRELESS COMMUNICATION SYSTEM, AND DEVICE THEREFOR

(71) Applicant: LG Electronics Inc., Seoul (KR)

(72) Inventors: Jinsoo Choi, Anyang-si (KR); Seunghee Han, Anyang-si (KR); Jinsam Kwak, Anyang-si (KR); Yongho Seok, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 14/395,306

(22) PCT Filed: Apr. 18, 2013

(86) PCT No.: PCT/KR2013/003297
§ 371 (c)(1),
(2) Date: Oct. 17, 2014

(87) PCT Pub. No.: WO2013/157868
PCT Pub. Date: Oct. 24, 2013

(65) Prior Publication Data
US 2015/0043409 A1     Feb. 12, 2015

Related U.S. Application Data

(60) Provisional application No. 61/635,266, filed on Apr. 18, 2012, provisional application No. 61/653,414, filed on May 31, 2012, provisional application No. 61/656,533, filed on Jun. 7, 2012.

(51) Int. Cl.
*G08C 17/00*     (2006.01)
*H04W 52/02*     (2009.01)

(52) U.S. Cl.
CPC ..... *H04W 52/0225* (2013.01); *H04W 52/0216* (2013.01); *H04W 52/0229* (2013.01); *Y02B 60/50* (2013.01)

(58) Field of Classification Search
USPC .................................................. 370/311, 252
See application file for complete search history.

(56) References Cited

U.S. PATENT DOCUMENTS

2003/0231597 A1* 12/2003 Hester ................ H04L 25/0202
                                                                                                   370/252
2007/0037548 A1    2/2007   Sammour et al.

(Continued)

FOREIGN PATENT DOCUMENTS

| KR | 10-2009-0034909 | 4/2009 |
| KR | 10-2010-0013505 | 2/2010 |
| KR | 10-2011-0102161 | 9/2011 |

OTHER PUBLICATIONS

International Search Report from PCT/KR2013/003132, dated Sep. 4, 2013.

(Continued)

*Primary Examiner* — Phuc Tran
(74) *Attorney, Agent, or Firm* — Dentons US LLP

(57) ABSTRACT

One embodiment of the present invention relates to a method for transmitting a signal of a station (STA) operable in a power saving mode in a wireless communication system, and the method for transmitting a signal comprises a step of transmitting a PS-Poll frame and/or a trigger frame according to a first time period, wherein an integrated scaling factor is applied to the first time period, and the integrated scaling factor is also commonly applied to a second time period in which the STA can omit frame transmission by maintaining an association state with an access point (AP).

13 Claims, 16 Drawing Sheets

(56) References Cited

U.S. PATENT DOCUMENTS

2008/0123577 A1* 5/2008 Jaakkola ........... H04W 52/0225
  370/311
2009/0257370 A1* 10/2009 Chen ................. H04W 52/0225
  370/311
2012/0250596 A1* 10/2012 Park .................. H04W 52/0219
  370/311

OTHER PUBLICATIONS

Written Opinion of the ISA from PCT/KR2013/003132, dated Sep. 4, 2013.

* cited by examiner (a)

(b)

FIG. 13
(a)
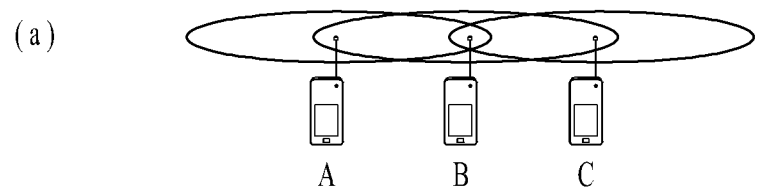
(b)
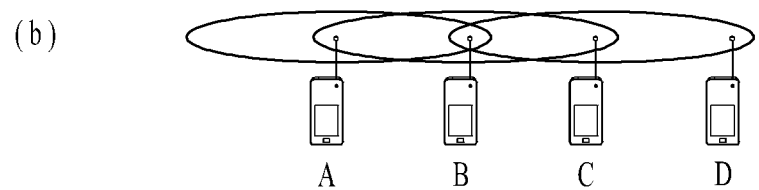
FIG. 14
(a)
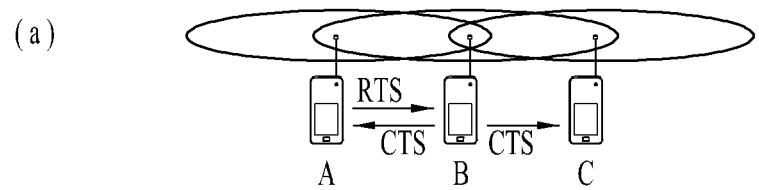
(b)
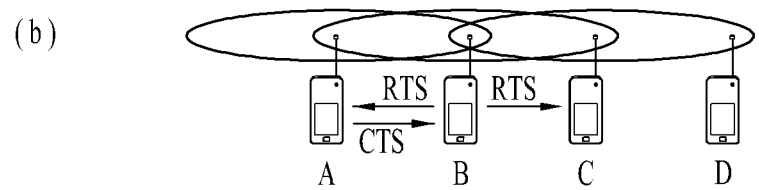

D1 = aRxRFDelay + aRxPLCPDelay (referenced from the end of the last symbol of a frame on the medium)
D2 = D1 + Air Propagation Time
Rx/Tx = aRXTXTurnaroundTime (begins with a PHYTXSTART.request)
M1 = M2 = aMACProcessingDelay
CCAdel = aCCA Time - D1

FIG. 21

| Listen Interval |
|---|
Octets: 2

FIG. 22

| Element ID | Length | Max Idle Period | Idle Options |
|---|---|---|---|
Octets: 1 1 2 1

METHOD FOR TRANSMITTING AND RECEIVING SIGNAL OF STATION OPERABLE IN POWER SAVING MODE IN WIRELESS COMMUNICATION SYSTEM, AND DEVICE THEREFOR

This application is a 35 USC §371 National Stage entry of International Application No. PCT/KR2013/003297 filed on Apr. 18, 2013 and claims priority to U.S. Provisional Application No. 61/635,266, filed Apr. 18, 2012, U.S. Provisional Application No. 61/653,414, filed May 31, 2012, and U.S. Provisional Application No. 61/656,533, filed Jun. 7, 2012, all of which are incorporated by reference in their entirety herein.

TECHNICAL FIELD

The following description relates to a wireless communication system and, more particularly, a method for transmitting and receiving a signal of a station (STA) operable in a power saving mode in a wireless local area network (LAN) system and a device for supporting the same.

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

DISCLOSURE

Technical Problem

In the present invention, disclosed herein is a method and apparatus for providing a longer sleep interval to a station (STA) operable in a power saving mode in a wireless communication system and, more particularly, a wireless local area network (LAN) system.

The technical problems solved by the present invention are not limited to the above technical problems and other technical problems which are not described herein will become apparent to those skilled in the art from the following description.

Technical Solution

The object of the present invention can be achieved by providing a method for transmitting a signal of a station (STA) operable in a power saving mode in a wireless communication system including transmitting at least one of a PS-Poll frame or a trigger frame according to a first time period, wherein a unified scaling factor is applied to the first time period, and wherein the unified scaling factor is commonly applied to a second time period during which the STA refrain from frame transmission to an access point (AP) with maintaining an association state.

In another aspect of the present invention, provided herein is a method for receiving a signal of a station (STA) operable in a power saving mode in a wireless communication system including switching to an awake state in order to receive a beacon frame and receiving the beacon frame, wherein a unified scaling factor is applied to a first time period for switching to the awake state, and wherein the unified scaling factor is commonly applied to a second time period during which the STA refrain from frame transmission to an access point (AP) with maintaining an association state.

The above-described aspects of the present invention may include the following features.

The unified scaling factor may be commonly applied to computation of a wireless network management (WNM) sleep interval.

The first time period may be a listen interval and the second time period may be a basic service set (BSS) max idle period.

The unified scaling factor may be applied by multiplying a value included in a listen interval field, a value included in a BSS max idle period element and a value included in a WNM sleep mode element by the unified scaling factor.

The STA may multiply a basic unit extension factor when applying the unified scaling factor to a value included in a listen interval field, a value included in a BSS max idle period element and a value included in a WNM sleep mode element.

The basic unit extension factor may be 1000 TU/BI when the unified scaling factor is applied to the value included in the listen interval field, may be 1 when the unified scaling factor is applied to the value included in the BSS max idle period element, and may be 1000 TU/DI if the unified scaling factor is applied to the value included in the WNM sleep mode element, where TU is 1024 µs, BI is a beacon interval and DI is a delivery traffic indication message (DTIM) interval.

A basic unit of the value included in the listen interval field may be BI, a basic unit of the value included in the BSS max idle period element may be 1000 TU and a basic unit of the value included in the WNM sleep mode element may be DI.

The listen interval may be determined based on a BSS max idle period included in a probe response frame received from the AP.

The probe response frame may be a response to a probe request frame including preference related to the BSS max idle period of the STA and the unified scaling factor.

The STA may transmit the listen interval to the AP via a reassociation request frame.

The listen interval may be determined based on a BSS max idle period included in an association response frame received from the AP.

The listen interval may be determined based on a BSS max idle period included in a beacon frame received from the AP.

The STA may determine the listen interval after receiving a beacon frame including the BSS max idle period.

Advantageous Effects

According to the present invention, it is possible to efficiently provide a longer sleep interval to a station (STA) operable in a power saving mode.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 13 is a diagram illustrating a hidden node and an exposed node;

FIG. 14 is a diagram illustrating request to send (RTS) and clear to send (CTS);

FIG. 21 is a diagram illustrating a listen interval;

FIG. 22 is a diagram illustrating a BSS max idle period;

BEST MODE

Figure 1:
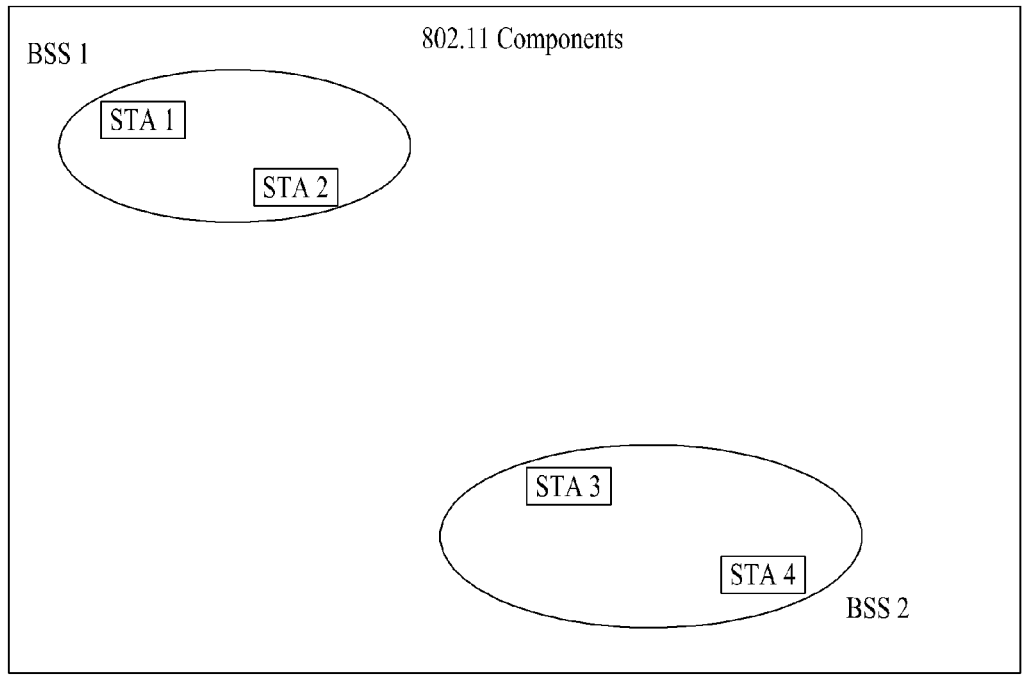
FIG. 1 is a diagram showing an exemplary structure of an IEEE 802.11 system to which the present invention is applicable.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

It should be noted that specific terms disclosed in the present invention are proposed for convenience of description and better understanding of the present invention, and the use of these specific terms may be changed to another format within the technical scope or spirit of the present invention.

Exemplary embodiments of the present invention are supported by standard documents disclosed for at least one of radio access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE.

For clarity, the following description focuses on a 3GPP LTE and 3GPP LTE-A system. However, technical features of the present invention are not limited thereto.

General System

FIG. 1 is a diagram showing an exemplary structure of an IEEE 802.11 system to which the present invention is applicable.

An IEEE 802.11 structure may be composed of a plurality of components and a wireless local area network (WLAN) supporting station (STA) mobility transparent to a higher layer may be provided by interaction among the components. A basic service set (BSS) may correspond to a basic component block in an IEEE 802.11 LAN. In FIG. 1, two BSSs (BSS1 and BSS2) are present and each BSS includes two STAs (STA1 and STA2 are included in BSS1 and STA3 and STA4 are included in BSS2) as members. In FIG. 1, an ellipse indicating the BSS indicates a coverage area in which STAs included in the BSS maintains communication. This area may be referred to as a basic service area (BSA). If an STA moves out of a BSA, the STA cannot directly communicate with other STAs in the BSA.

In an IEEE 802.11 LAN, a BSS is basically an independent BSS (IBSS). For example, the IBSS may have only two STAs. In addition, the simplest BSS (BSS1 or BSS2) of FIG. 1, in which other components are omitted, may correspond to a representative example of the IBSS. Such a configuration is possible when STAs can directly perform communication. In addition, such a LAN is not configured in advance but may be configured if a LAN is necessary. This LAN may also be referred to as an ad-hoc network.

If an STA is turned on or off or if an STA enters or moves out of a BSS, the membership of the STA in the BSS may be dynamically changed. An STA may join a BSS using a synchronization process in order to become a member of the BSS. In order to access all services of a BSS based structure, an STA should be associated with the BSS. Such association may be dynamically set and may include use of a distribution system service (DSS).

Figure 2:
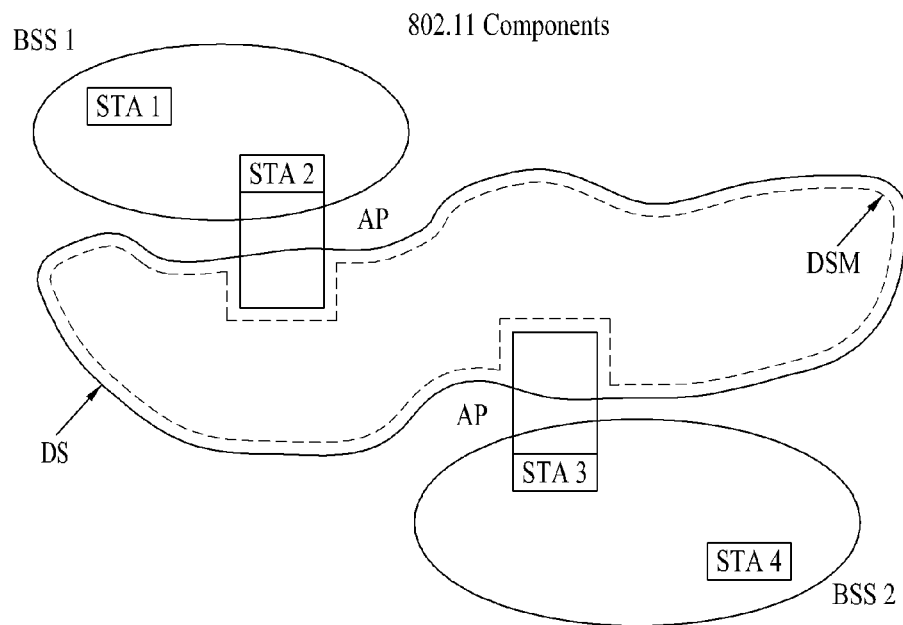
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, a distribution system (DS), a distribution system medium (DSM) and an access point (AP) are added to the structure of FIG. 1.

In a LAN, a direct station-to-station distance may be restricted by PHY performance. Although such distance restriction may be satisfactory in some cases, communication between stations located at a longer distance may be necessary. In order to support extended coverage, a DS may be configured.

The DS means a structure in which BSSs are mutually connected. More specifically, the BSSs are not independently present as shown in FIG. 1 but the BSS may be present as an extended component of a network including a plurality of BSSs.

The DS is a logical concept and may be specified by characteristics of the DSM. In IEEE 802.11 standards, a wireless medium (WM) and a DSM are logically distinguished. Logical media are used for different purposes and are used by different components. In IEEE 802.11 standards, such media are not restricted to the same or different media. Since a plurality of media are logically different, an IEEE 802.11 LAN structure (a DS structure or another network structure) may be flexible. That is, the IEEE 802.11 LAN structure may be variously implemented and a LAN structure may be independently specified by physical properties of each implementation.

The DS provides seamless integration of a plurality of BSSs and provides logical services necessary to treat an address to a destination so as to support a mobile apparatus.

The AP means an entity which enables associated STAs to access the DS via the WM and has STA functionality. Data transfer between the BSS and the DS may be performed via the AP. For example, STA2 and STA3 shown in FIG. 2 have STA functionality and provide a function enabling associated STAs (STA1 and STA4) to access the DS. In addition, since all APs correspond to STAs, all APs may be addressable entities. An address used by the AP for communication on the WM and an address used by the AP for communication on the DSM may not be equal.

Data transmitted from one of STAs associated with the AP to the STA address of the AP may always be received by an uncontrolled port and processed by an IEEE 802.1X port access entity. In addition, if a controlled port is authenticated, transmission data (or frames) may be transmitted to the DS.

Figure 3:
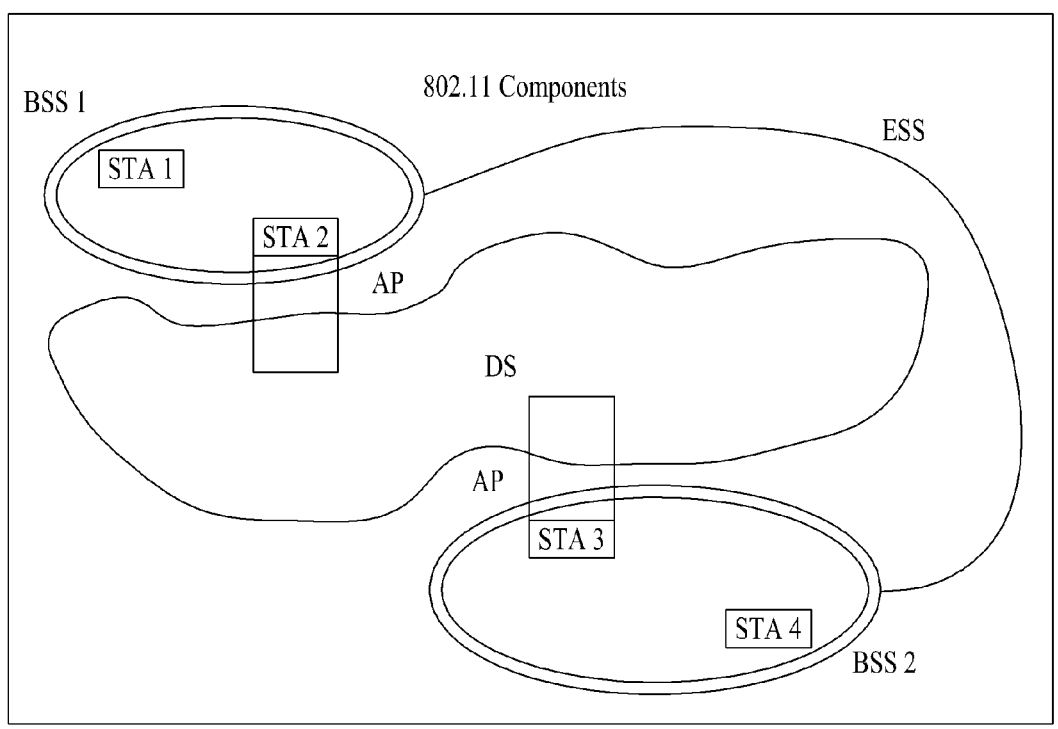
FIG. 3 is a diagram showing another exemplary structure of an IEEE 802.11 system to which the present invention is applicable.

FIG. 3 is a diagram showing another exemplary structure of an IEEE 802.11 system to which the present invention is applicable. In FIG. 3, an extended service set (ESS) for providing wide coverage is added to the structure of FIG. 2.

A wireless network having an arbitrary size and complexity may be composed of a DS and BSSs. In an IEEE 802.11 system, such a network is referred to as an ESS network. The ESS may correspond to a set of BSSs connected to one DS. However, the ESS does not include the DS. The ESS network appears as an IBSS network at a logical link control (LLC) layer. STAs included in the ESS may communicate with each other and mobile STAs may move from one BSS to another BSS (within the same ESS) transparently to the LLC layer.

In IEEE 802.11, relative physical locations of the BSSs in FIG. 3 are not assumed and may be defined as follows. The BSSs may partially overlap in order to provide consecutive coverage. In addition, the BSSs may not be physically connected and a distance between BSSs is not logically restricted. In addition, the BSSs may be physically located at the same location in order to provide redundancy. In addition, one (or more) IBSS or ESS network(s) may be physically present in the same space as one (or more) ESS network(s). This corresponds to an ESS network type such as a case in which an ad-hoc network operates at a location where the ESS network is present, a case in which IEEE 802.11 networks physically overlapped by different organizations are configured or a case in which two or more different access and security policies are necessary at the same location.

Figure 4:
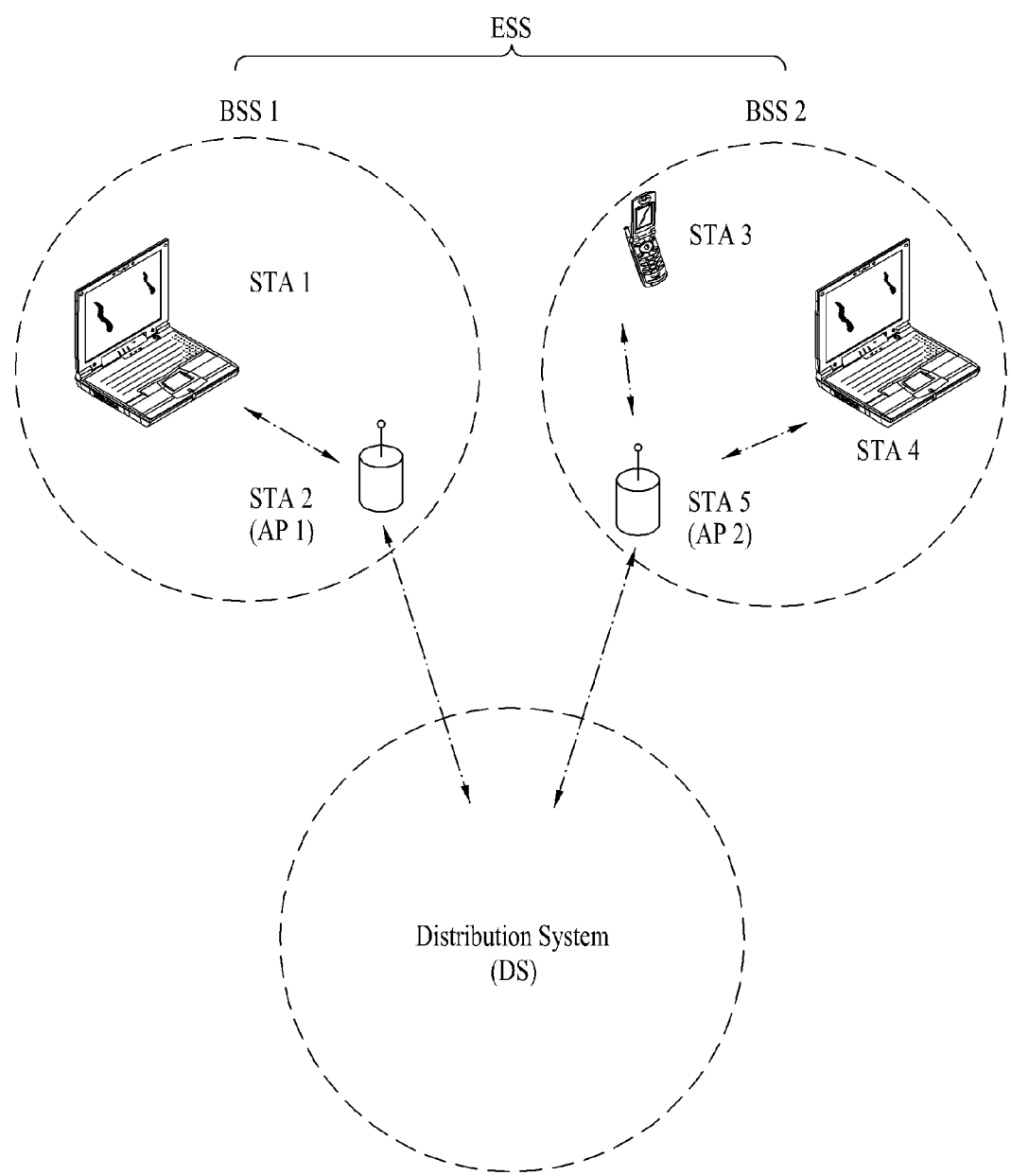
FIG. 4 is a diagram showing an exemplary structure of a wireless local area network (WLAN) system.

FIG. 4 is a diagram showing an exemplary structure of a WLAN system. FIG. 4 shows an example of an infrastructure BSS including a DS.

In the example of FIG. 4, BSS1 and BSS2 configure an ESS. In the WLAN system, an STA operates according to a MAC/PHY rule of IEEE 802.11. The STA includes an AP STA and a non-AP STA. The non-AP STA corresponds to an apparatus directly handled by a user, such as a laptop or a mobile phone. In the example of FIG. 4, STA1, STA3 and STA4 correspond to the non-AP STA and STA2 and STA5 correspond to the AP STA.

In the following description, the non-AP STA may be referred to as a terminal, a wireless transmit/receive unit (WTRU), a user equipment (UE), a mobile station (MS), a mobile terminal or a mobile subscriber station (MSS). In addition, the AP may correspond to a base station (BS), a Node-B, an evolved Node-B (eNB), a base transceiver system (BTS) or a femto BS.

Figure 5:
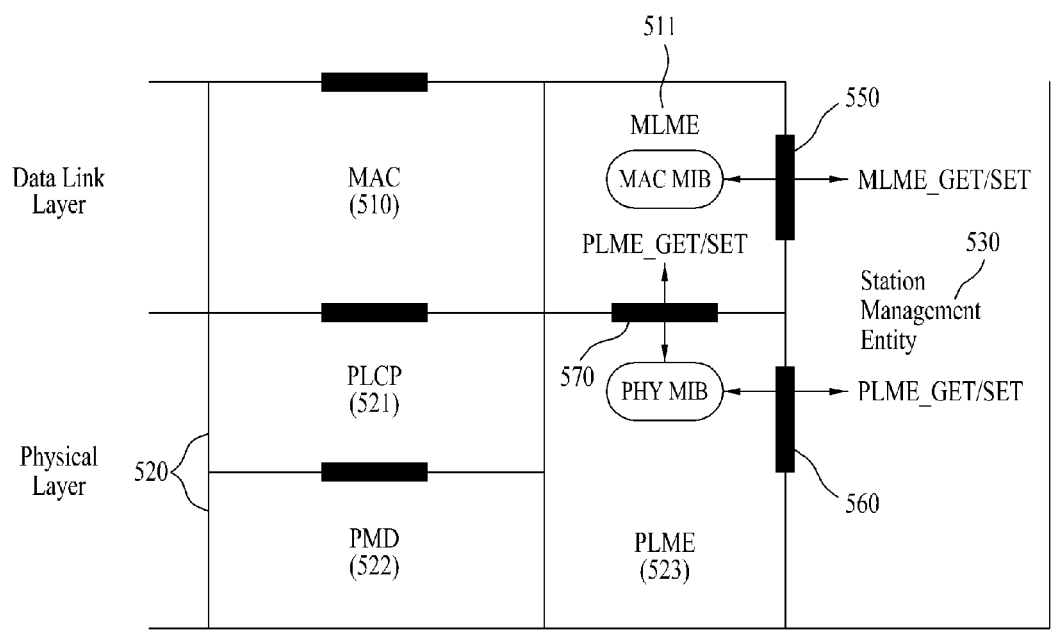
FIG. 5 is a diagram showing the structure of a data link layer and a physical layer of an IEEE 802.11 system to which the present invention is applicable.

FIG. 5 is a diagram showing the structure of a data link layer and a physical layer of an IEEE 802.11 system to which the present invention is applicable.

Referring to FIG. 5, the physical layer 520 may include a physical layer convergence procedure (PLCP) entity 521 and a physical medium dependent (PMD) entity 522. The PLCP entity 521 is responsible for connecting a MAC sublayer 510 and a data frame. The PMD entity 522 is responsible for wirelessly transmitting and receiving data to and from two or more STAs using an orthogonal frequency division multiplexing (OFDM) scheme.

The MAC sublayer 510 and the physical layer 520 may respectively include management entities, which are respectively referred to as MAC sublayer management entity (MLME) 511 and a physical layer management entity (PLM) 523. These entities 511 and 521 provide a layer management service interface, for operation of a layer management function.

To provide accurate MAC operation, a station management entity (SME) 530 may be included in each STA. The SME 530 is a management entity independent of each layer, which collects layer based state information from several layer management entities and sets specific parameter values of layers. The SME 530 may perform such functions in place of general system management entities and implement standard management protocols.

Such entities may interact using various methods. FIG. 5 shows an example of exchanging GET/SET primitives. An XX-GET.request primitive is used to request a management information base (MIB) attribute value, the MIB attribute value is returned if an XX-GET.confirm primitive is in a "SUCCESS" state and, otherwise, a state field indicating an error state is returned. An XX-SET.request primitive is used to request setting of a designated MIB attribute value to a given value. If the MOB attribute value indicates a specific operation, execution of the specific operation is requested. If the state of an XX-SET.confirm primitive is "SUCCESS", this means that the designated MIB attribute value is set to a requested value. Otherwise, the state field indicates an error state. If this MIB attribute value indicates a specific operation, this primitive may indicate that the specific operation has been performed.

As shown in FIG. 5, various primitives may be exchanged between the MLME 511 and the SME 530 and between the PLME 523 and the SME 530 via an MLME Service access point (SAP) 550 and a PLME_SAP 560, respectively. Primitives may be exchanged between the MLME 511 and the PLME 523 via an MLME-PLME_SAP 570.

Link Setup Process

Figure 6:
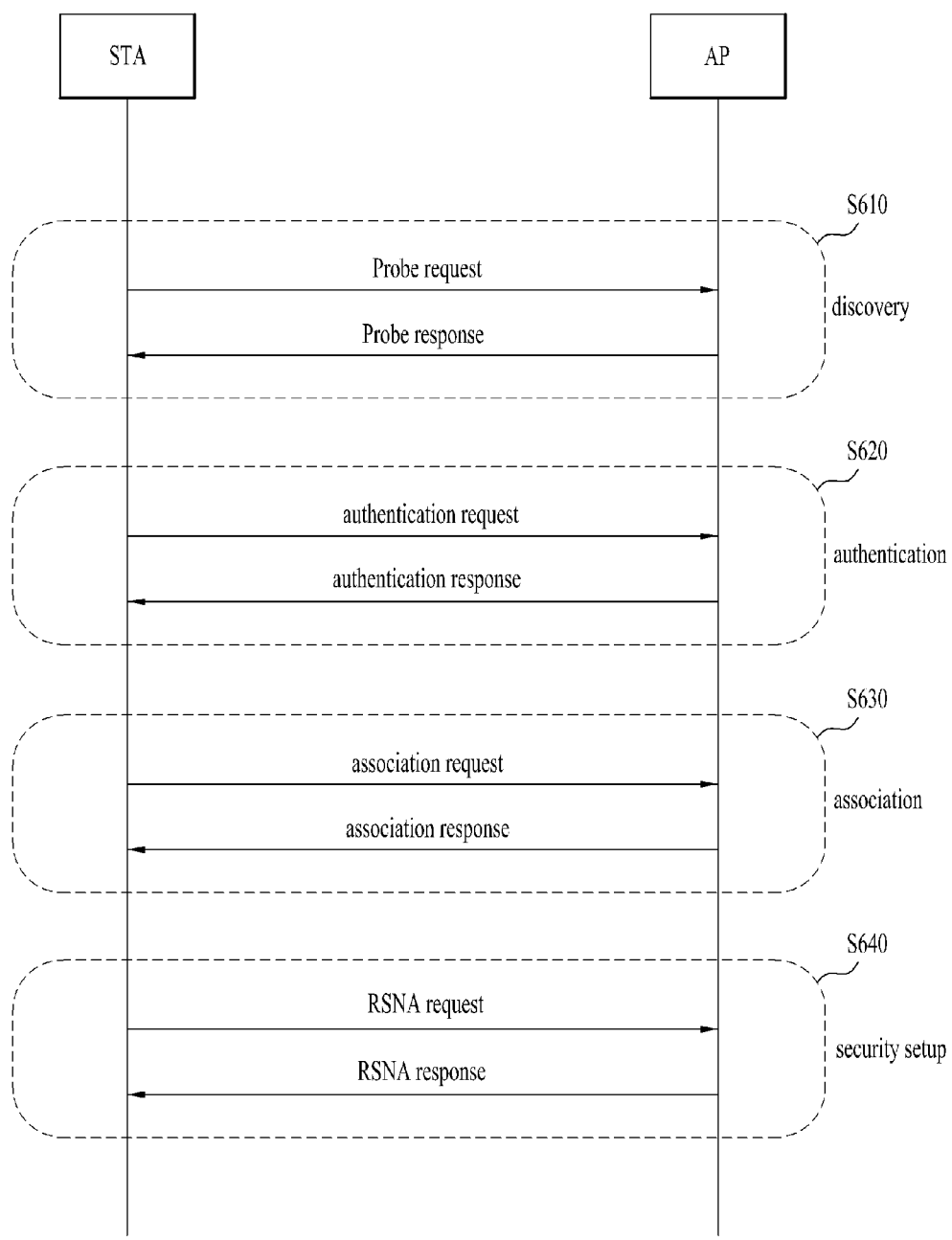
FIG. 6 is a diagram illustrating a general link setup process in a WLAN system to which the present invention is applicable.

FIG. 6 is a diagram illustrating a general link setup process.

In order to establish a link with respect to a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 6.

In step S610, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning.

The scanning method includes an active scanning method and a passive scanning method.

In FIG. 6, a network discovery operation including an active scanning process is shown. In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on a second channel) using the same method.

Although not shown in FIG. 6, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs in the IBSS alternately transmit the beacon frame. The STA which performs scanning receives the beacon frame, stores information about the BSS included in the beacon frame, and records beacon frame information of each channel while moving to another channel. The STA, which has received the beacon frame, may store BSS related information included in the received beacon frame, move to a next channel and perform scanning on the next channel using the same method.

Active scanning has delay and power consumption less than those of passive scanning.

After the STA has discovered the network, an authentication process may be performed in step S620. Such an authentication process may be referred to as a first authentication process to be distinguished from a security setup operation of step S640.

The authentication process includes a process of, at the STA, transmitting an authentication request frame to the AP and, at the AP, transmitting an authentication response frame to the STA in response thereto. The authentication frame used for authentication request/response corresponds to a management frame.

The authentication frame may include information about an authentication algorithm number, an authentication transaction sequence number, a status code, a challenge text, a robust security network (RSN), a finite cyclic group, etc. The information may be examples of information included in the authentication request/response frame and may be replaced with other information. The information may further include additional information.

The STA may transmit the authentication request frame to the AP. The AP may determine whether authentication of the STA is allowed, based on the information included in the received authentication request frame. The AP may provide the STA with the authentication result via the authentication response frame.

After the STA has been successfully authenticated, an association process may be performed in step S630. The association process includes a process of, at the STA, transmitting an association request frame to the AP and, at the AP, transmitting an association response frame to the STA in response thereto.

For example, the association request frame may include information about various capabilities, beacon listen interval, service set identifier (SSID), supported rates, RSN, mobility domain, supported operating classes, traffic indication map (TIM) broadcast request, interworking service capabilities, etc.

For example, the association response frame may include information about various capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is purely exemplary information included in the association request/response frame and may be replaced with other information. This information may further include additional information.

After the STA is successfully authenticated, a security setup process may be performed in step S640. The security setup process of step S640 may be referred to as an authentication process through a robust security network association (RSNA) request/response. The authentication process of step S620 may be referred to as the first authentication process and the security setup process of step S640 may be simply referred to as an authentication process.

The security setup process of step S640 may include a private key setup process through 4-way handshaking of an extensible authentication protocol over LAN (EAPOL) frame. In addition, the security setup process may be performed according to a security method which is not defined in the IEEE 802.11 standard.

Evolution of WLAN

As a technical standard recently established in order to overcome limitations in communication speed in a WLAN, IEEE 802.11n has been devised. IEEE 802.11n aims at increasing network speed and reliability and extending wireless network distance. More specifically, IEEE 802.11n is based on multiple input and multiple output (MIMO) technology using multiple antennas in a transmitter and a receiver in order to support high throughput (HT) with a maximum data rate of 540 Mbps or more, to minimize transmission errors, and to optimize data rate.

As WLANs have come into widespread use and applications using the same have been diversified, recently, there is a need for a new WLAN system supporting throughput higher than a data rate supported by IEEE 802.11n. A next-generation WLAN system supporting very high throughput (VHT) is a next version (e.g., IEEE 802.11ac) of the IEEE 802.11n WLAN system and is an IEEE 802.11 WLAN system newly proposed in order to support a data rate of 1 Gbps or more at a MAC service access point (SAP).

The next-generation WLAN system supports a multi-user MIMO (MU-MIMO) transmission scheme by which a plurality of STAs simultaneously accesses a channel in order to efficiently use a radio channel. According to the MU-MIMO transmission scheme, the AP may simultaneously transmit packets to one or more MIMO-paired STAs. In addition, support of a WLAN system operation in a whitespace is being discussed. For example, introduction of a WLAN system in a TV whitespace (WS) such as a frequency band (e.g., 54 to 698 MHz) in an idle state due to digitalization of analog TVs is being discussed as the IEEE 802.11af standard. However, this is only exemplary and the whitespace may be incumbently used by a licensed user. The licensed user means a user who is allowed to use a licensed band and may be referred to as a licensed device, a primary user or an incumbent user.

For example, the AP and/or the STA which operate in the WS should provide a protection function to the licensed user. For example, if a licensed user such as a microphone already uses a specific WS channel which is a frequency band divided on regulation such that a WS band has a specific bandwidth, the AP and/or the STA cannot use the frequency band corresponding to the WS channel in order to protect the licensed user. In addition, the AP and/or the STA must stop use of the frequency band if the licensed user uses the frequency band used for transmission and/or reception of a current frame.

Accordingly, the AP and/or the STA should perform a procedure of determining whether a specific frequency band in a WS band is available, that is, whether a licensed user uses the frequency band. Determining whether a licensed user uses a specific frequency band is referred to as spectrum sensing. As a spectrum sensing mechanism, an energy detection method, a signature detection method, etc. may be used. If received signal strength is equal to or greater than a predetermined value or if a DTV preamble is detected, it may be determined that the licensed user uses the frequency band.

In addition, as next-generation communication technology, machine-to-machine (M2M) communication technology is being discussed. Even in an IEEE 802.11 WLAN system, a technical standard supporting M2M communication has been developed as IEEE 802.11ah. M2M communication means a communication scheme including one or more machines and may be referred to as machine type communication (MTC). Here, a machine means an entity which does not require direct operation or intervention of a person. For example, a device including a mobile communication module, such as a meter or a vending machine, may include a user equipment such as a smart phone which is capable of automatically accessing a network without operation/intervention of a user to perform communication. M2M communication includes communication between devices (e.g., device-to-device (D2D) communication) and communication between a device and an application server. Examples of communication between a device and a server include communication between a vending machine and a server, communication between a point of sale (POS) device and a server and communication between an electric meter, a gas meter or a water meter and a server. An M2M communication based application may include security, transportation, health care, etc. If the characteristics of such examples are considered, in general, M2M communication should support transmission and reception of a small amount of data at a low rate in an environment in which very many apparatuses are present.

More specifically, M2M communication should support a larger number of STAs. In a currently defined WLAN system, it is assumed that a maximum of 2007 STAs is associated with one AP. However, in M2M communication, methods supporting the case in which a larger number of STAs (about 6000) are associated with one AP are being discussed. In addition, in M2M communication, it is estimated that there are many applications supporting/requiring a low transfer rate. In order to appropriately support the low transfer rate, for example, in a WLAN system, the STA may recognize presence of data to be transmitted thereto based on a traffic indication map (TIM) element and methods of reducing a bitmap size of the TIM are being discussed. In addition, in M2M communication, it is estimated that there is traffic having a very long transmission/reception interval. For example, in electricity/gas/water consumption, a very small amount of data is required to be exchanged at a long period (e.g., one month). In a WLAN system, although the number of STAs associated with one AP is increased, methods of efficiently supporting the case in which the number of STAs, in which a data frame to be received from the AP is present during one beacon period, is very small are being discussed.

WLAN technology has rapidly evolved. In addition to the above-described examples, technology for direct link setup, improvement of media streaming performance, support of fast and/or large-scale initial session setup, support of extended bandwidth and operating frequency, etc. is being developed.

Frame Structure

Figure 7:
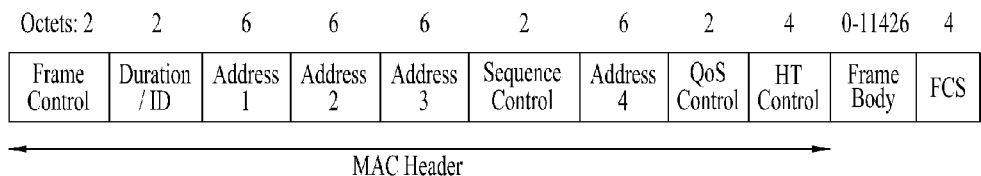
FIG. 7 is a diagram showing a MAC frame format of an IEEE 802.11 system to which the present invention is applicable.

FIG. 7 is a diagram showing a MAC frame format of an IEEE 802.11 system to which the present invention is applicable.

Referring to FIG. 7, the MAC frame format includes a MAC header (MHR), a MAC payload and a MAC footer. The MHR includes a frame control field, a duration/ID field, an address 1 field, an address 2 field, an address 3 field, a sequence control field, an address 4 field, a QoS control field and an HT control field. A frame body field is defined as a MAC payload, at which data to be transmitted by a higher layer is located, and has a variable size. A frame check sequence (FCS) field is defined as a MAC footer and is used for error detection of a MAC frame.

The first three fields (the frame control field, the duration/ID field and the address 1 field) and the last field (the FCS field) configure a minimum frame format and are included in all frames. The other fields may be included in a specific type of frame.

Information included in the above-described fields may follow definition of the IEEE 802.11 system. In addition, the above-described fields are examples of fields which may be included in the MAC frame and may be replaced with other fields or additional fields may be further included.

Figure 8:
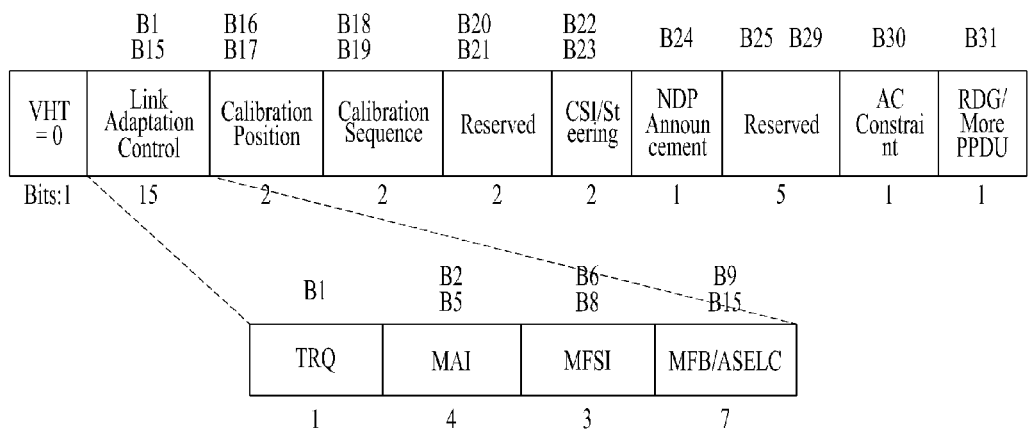
FIG. 8 is a diagram showing an HT format of an HT control field in a MAC frame of FIG. 7.

FIG. 8 is a diagram showing an HT format of an HT control field in a MAC frame of FIG. 7.

Referring to FIG. 8, the HT control field may include a VHT subfield, a link adaptation subfield, a calibration position subfield, a calibration sequence subfield, a channel state information (CSI)/steering subfield, a null data packet (NDP) announcement subfield, an access category (AC) constraint subfield, a reverse direction grant (RDG)/more PPDU subfield and a reserved subfield.

The link adaptation control field may include a training request (TRQ) subfield, a modulation and coding scheme (MCS) request or antenna selection (ASEL) indication subfield, an MCS feedback sequence identifier (MFSI) subfield and an MCS feedback and antenna selection command/data (MFB/ASELC) subfield.

The TRQ subfield is set to 1 when a responder is requested to transmit a sounding PPDU and is set to 0 when a responder is not requested to transmit a sounding PPDU. If the MAC subfield is set to 14, ASEL indication is indicated and the MFB/ASELC subfield is interpreted as antenna selection command/data. Otherwise, the MAI subfield indicates an MCS request and the MFB/ASELC subfield is interpreted as MCS feedback. In the case in which the MAI subfield indicates an MCS request (MRQ), the MAI subfield is set to 0 if no MCS feedback is requested and is set to 1 if MCS feedback is requested. The sounding PPDU means a PPDU for sending a training symbol which may be used for channel estimation.

The above-described subfields are examples of the fields which may be included in the HT control frame and may be replaced with other fields or additional fields may be further included.

Figure 9:
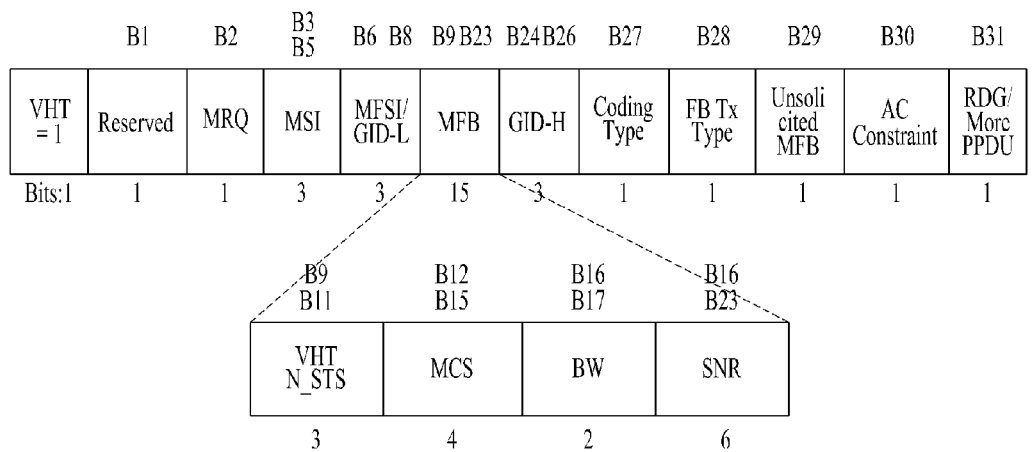
FIG. 9 is a diagram showing a VHT format of an HT control field in a MAC frame of FIG. 7.

FIG. 9 is a diagram showing a VHT format of an HT control field in a MAC frame of FIG. 7.

Referring to FIG. 9, the HT control field may include a VHT subfield, an MRQ subfield, an MSI subfield, an MCS feedback sequence indication/least significant bit (LSB) of group ID (MFSI/GID-L) subfield, an MFB subfield, a most significant bit (MSB) of group ID (GID-H) subfield, a coding type subfield, a transmission type of MFB response (FB Tx Type) subfield, an unsolicited MFB subfield, an AC constraint subfield and an RDG/more PPDU subfield. The MFB subfield may include a VHT number-of-space-time-streams (N_STS) subfield, an MCS subfield, a bandwidth (BW) subfield and a signal to noise ratio (SNR) subfield.

Table 1 shows a description of the subfields in the VHT format of the HT control field.

TABLE 1

| Subfield | Meaning | Definition |
|---|---|---|
| MRQ | MCS request | Set to 1 if MCS feedback (solicited MFB) is requested and, otherwise, set to 0. |
| MSI | MRQ sequence identifier | If the MRQ subfield is set to 1, the MCI subfield includes a sequence number in a range of 0 to 6 identifying a specific request. If the MRQ subfield is set to 0, the MSI subfield is reserved. |
| MFSI/GID-L | MFB sequence identifier/LSB of Group ID | If the unsolicited MFB subfield is set to 0, the MFSI/GID-L subfield includes a received value of the MSI included in a frame indicated by MFB information. If the unsolicited MFB subfield is set to 1, the MFSI/GID-L subfield includes LSB 3 bits of a group ID of a PPDU indicated by the unsolicited MFB. |
| MFB | VHT N_STS, MCS, BW, SNR feedback | The MFB subfield includes a recommended MFB. MCS = 15 and VHT N_STS = 7 indicate that feedback is not present. |
| GID-H | MSB of Group ID | If the unsolicited MFB subfield is set to 1, the GID-H subfield includes MSB 3 bits of a group ID of a PPDU indicated by the unsolicited MFB. |
| Coding Type | Coding type of MFB response | If the unsolicited MFB subfield is set to 1, the coding type subfield includes coding information (1 in case of binary convolutional code (BCC) and 0 in case of low-density parity check (LDPC)) indicated by the unsolicited MFBG. Otherwise, the coding type subfield is reserved. |

TABLE 1-continued

| Subfield | Meaning | Definition |
| --- | --- | --- |
| FB Tx Type | Transmission type of MFB response | If the unsolicited MFB subfield is set to 1 and the FB Tx type subfield is set to 0, the unsolicited MFB indicates any one of transmit diversities which use an unbeamformed VHT PPDU or a space-time block coding (STBC) VHT PPDU. If the unsolicited MFB subfield is set to 1 and the FB Tx type subfield is set to 1, the unsolicited MFB indicates a beamformed single user (SU)-MIMO VHT PPDU. Otherwise, the FB Tx type subfield is reserved. |
| Unsolicited MFB | Unsolicited MCS feedback indicator | Set to 1 if the MFB is not a response of the MRQ and set to 0 if the MFB is a response of the MRQ. |
| AC constraint | | Set to 0 if a response to the RDG includes a data frame from any traffic identifier (TID) and set to 1 if a response to the RDG includes only a frame from the same AC as a last data frame received from the same RD initiator. |
| RDG/More PPDU | | If the RDG/more PPDU subfield is 0, this indicates that the RDG is not present when transmission is performed by an RD initiator and this indicates that a PPDU for delivering a MAC frame is final transmission when transmission is performed by an RD responder. If the RDG/more PPDU subfield is 1, this indicates that the RDG is present when transmission is performed by an RD initiator and this indicates that a subsequent PPDU is present after the PPDU for delivering the MAC frame when transmission is performed by an RD responder. |

The above-described subfields are examples of the fields which may be included in the HT control frame and may be replaced with other fields or additional fields may be further included.

The MAC sublayer delivers a MAC protocol data unit (MPDU) to the physical layer as a physical service data unit (PSDU). The PLCP entity attaches a physical (PHY) header and a preamble to the received PSDU to generate a PLCP protocol data unit (PPDU).

Figure 10:
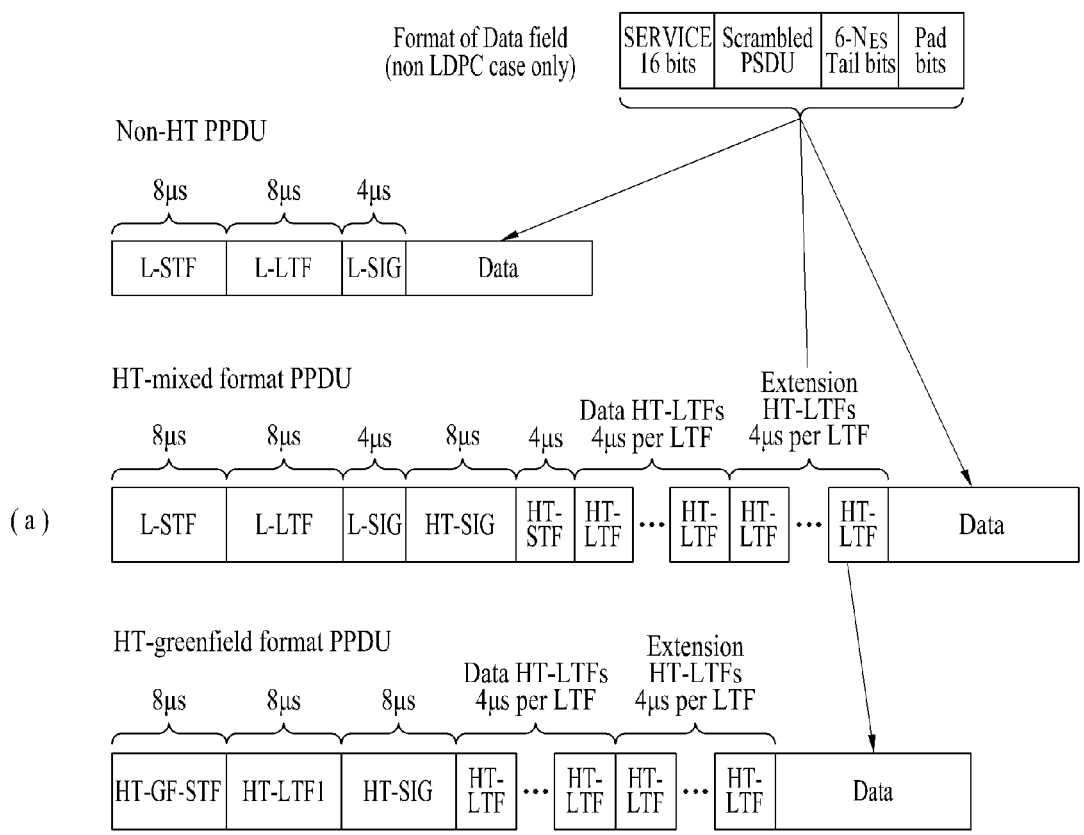
FIG. 10 is a diagram showing a PPDU frame of an IEEE 802.11n system to which the present invention is applicable.

FIG. 10 is a diagram showing a PPDU frame of an IEEE 802.11n system to which the present invention is applicable.

FIG. 10(a) shows a PPDU frame according to a non-HT format, an HT-mixed format and an HT-greenfield format.

The non-HT format indicates a frame format for a legacy system (IEEE 802.11 a/g) STA. The non-HT format PPDU includes a legacy format preamble including a legacy-short training field (L-SF), a legacy-long training field (L-LTF) and a legacy signal (L-SIG) field.

The HT-mixed format indicates a frame format for an IEEE 802.11n STA and grants communication of a legacy system STA. The HT-mixed format PPDU includes a legacy format preamble including an L-STF, an L-LTF and an L-SIG field and an HT format preamble including an HT-short training field (STF), an HT-long training field (LTF) and an HT-signal (HT-SIG) field. Since the L-STF, the L-LTF and the L-SIG are legacy fields for backward compatibility, the L-STF to the L-SIG field are equal to those of the non-HT field and the STA may confirm the mixed format PPDU using the HT-SIG field.

The HT-greenfield format is a format without compatibility with a legacy system and indicates a frame format for an IEEE 802.11n STA. The HT-greenfield format PPDU includes a greenfield preamble including an HT-greenfield (GF)-STF, an HT-LTF1, an HT-SIG field and one or more HT-LTFs.

A data field includes a service field, a PSDU, a tail bit, and a pad bit. All bits of the data field are scrambled.

FIG. 10(b) shows a service field included in the data field. The service field has 16 bits. The bits are assigned 0 to 15 and are sequentially transmitted starting from a $0^{th}$ bit. $0^{th}$ to sixth bits are set to 0 and are used to synchronize a descrambler in a receiver.

Figure 11:
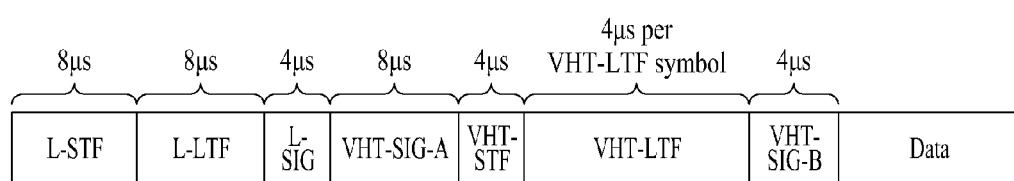
FIG. 11 is a diagram showing a VHT PPDU frame format of an IEEE 802.11ac system to which the present invention is applicable.

FIG. 11 is a diagram showing a VHT PPDU frame format of an IEEE 802.11ac system to which the present invention is applicable.

Referring to FIG. 11, the VHT format PPDU includes a legacy format preamble including an L-STF, an L-LTF and an L-SIG field and a VHT format preamble including a VHT-SIG-A field, an HT-STF and HT-LTFs, before the data field. Since the L-STF, the L-LTF and the L-SIG field are legacy fields for backward compatibility, the L-STF to the L-SIG field are equal to those of the non-HT field and the STA may confirm the VHT format PPDU using the VHT-SIG field.

The L-STF is a field for frame detection, auto gain control (AGC), diversity detection, coarse frequency/time synchronization, etc. The L-LTF is a field for fine frequency/time synchronization, channel estimation, etc. The L-SIG field is a field for legacy control information transmission. The VHT-SIG-A field is a VHT field for common control information transmission of VHT STAs. The VHT-STF is a field for AGC for MIMO and beamformed streams. The VHT-LTFs are fields for channel estimation for MIMO and beamformed streams. The VHT-SIG-B field is a field for transmitting specific control information.

Medium Access Mechanism

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF inter-frame space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 12:
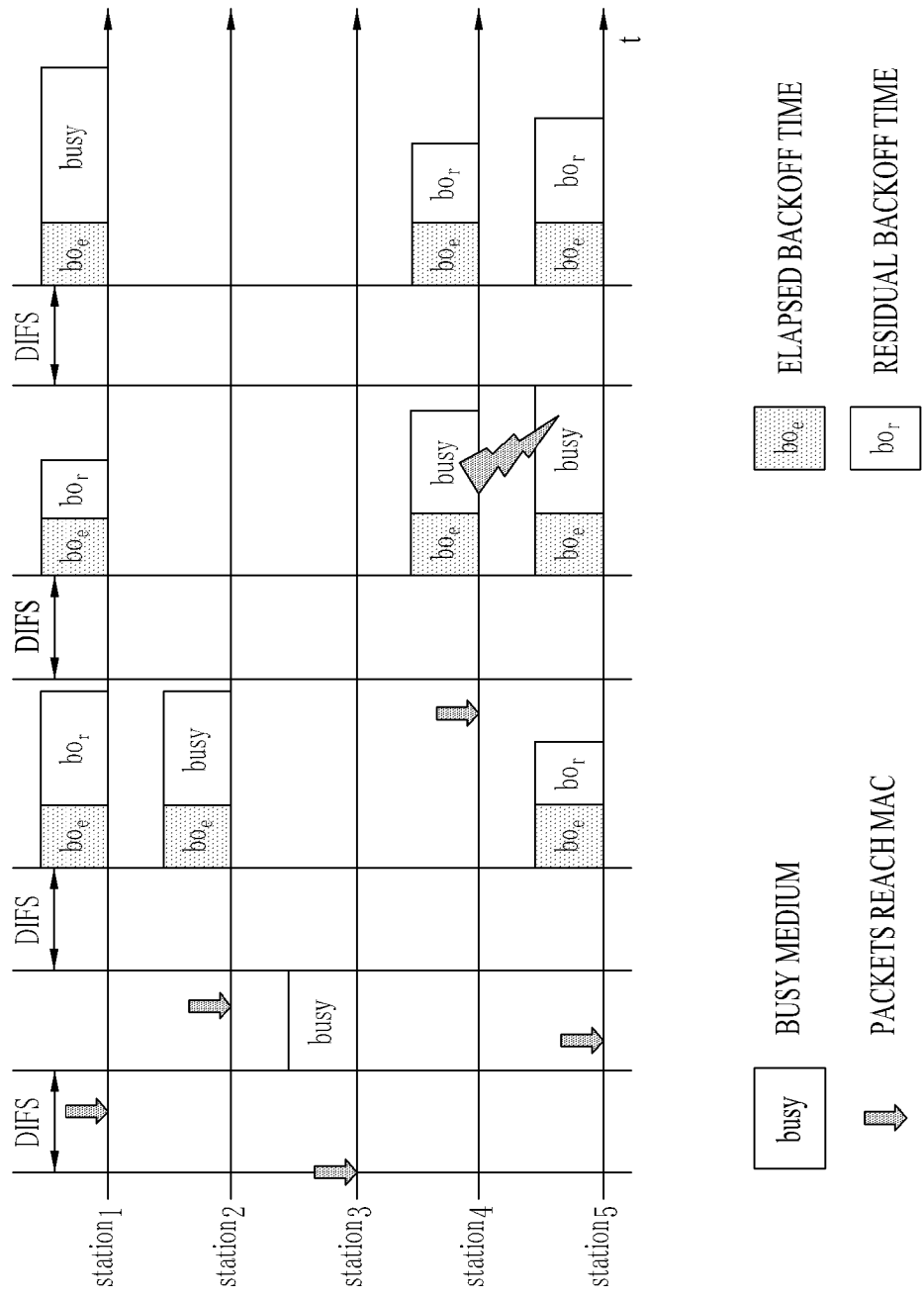
FIG. 12 is a diagram illustrating a backoff process in a wireless LAN system to which the present invention is applicable.

FIG. 12 is a diagram illustrating a backoff process in a wireless local area network (LAN) system to which the present invention is applicable.

Operation based on a random backoff period will be described with reference to FIG. 12.

If a medium is changed from an occupied or busy state to an idle state, several STAs may attempt data (or frame) transmission. At this time, a method of minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to $2^n-1$ (n= 0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 12, if packets to be transmitted arrive at the MAC of STA3, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 12, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state again, STA1 and STA5 wait for the DIFS and then resume countdown. That is, after the residual backoff slots corresponding to the residual backoff time are counted down, frame transmission may start. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 6, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 13 and 14. Although a transmission range may not be equal to an actual carrier sensing range, for convenience, assume that the transmission range may be equal to the actual carrier sensing range.

FIG. 13 is a diagram illustrating a hidden node and an exposed node.

FIG. 13(a) shows a hidden node, and, in this case, an STA A and an STA B are performing communication and an STA C has information to be transmitted. More specifically, although the STA A transmits information to the STA B, the STA C may determine that the medium is in the idle state, when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be the hidden node of the STA C.

FIG. 13(b) shows an exposed node and, in this case, the STA B transmits data to the STA A and the STA C has information to be transmitted to the STA D. In this case, if the STA C performs carrier sensing, it may be determined that the medium is busy due to transmission of the STA B. If the STA C has information to be transmitted to the STA D, since it is sensed that the medium is busy, the STA C waits until the medium enters the idle state. However, since the STA A is actually outside the transmission range of the STA C, transmission from the STA C and transmission from the STA B may not collide from the viewpoint of the STA A.

Therefore, the STA C unnecessarily waits until transmission of the STA B is stopped. At this time, the STA C may be the exposed node of the STA B.

FIG. 14 is a diagram illustrating request to send (RTS) and clear to send (CTS).

In the example of FIG. 13, in order to efficiently use a collision avoidance mechanism, short signaling packet such as RTS and CTS may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 14(a) shows a method of solving a hidden node problem. Assume that both the STA A and the STA C attempt to transmit data to the STA B. If the STA A transmits the RTS to the STA B, the STA B transmits the CTS to the peripheral STA A and C. As a result, the STA C waits until data transmission of the STA A and the STA B is finished, thereby avoiding collision.

FIG. 14(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS of the STA A, it can be confirmed that the STA A is outside carrier sensing of the STA C.

Inter-Frame Space (IFS)

A space in time between two frames is defined as an inter-frame space (IFS). An STA determines whether a channel is used during an IFS via carrier sensing. A DCF MAC layer defines four IFSs to determine priority for occupancy of a wireless medium.

The IFS is set to a specific value according to physical layer, regardless of a bit rate of an STA. The IFS includes a short IFS (SIFS), a PCF IFS (PIFS), a DCF IFS (DIFS) and an extended IFS (EIFS). The SIFS is used for RTS/CTS and ACK frame transmission and has highest priority. The PIFS is used for PCF frame transmission and the DIFS is used for DCF frame transmission. The EIFS is used only when frame transmission errors occur and does not have a fixed spacing.

A relationship between IFSs is defined as a time gap on a medium. Related attributes thereof are provided by a physical layer as shown in FIG. 15.

Figure 15:
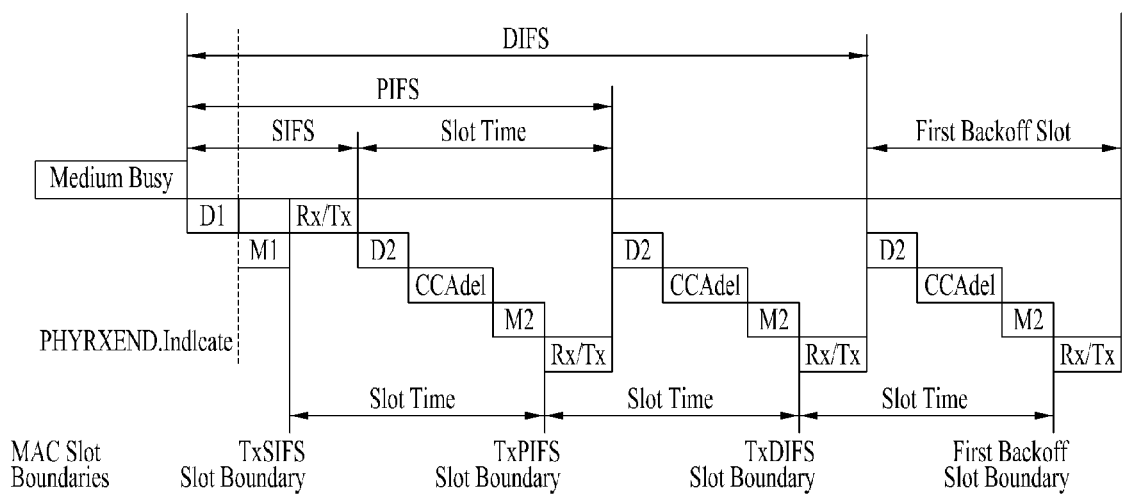
FIG. 15 is a diagram showing a relationship between inter-frame spaces (IFSs)

FIG. 15 is a diagram showing a relationship between inter-frame spaces (IFSs).

At all medium timings, an end time of a last symbol of a PPDU indicates that transmission ends and a first symbol of a preamble of a next PPDU indicates that transmission starts. All MAC timings may be determined by referring to a PHY-TXEND.confirm primitive, a PHYTXSTART.confirm primitive, a PHY-RXSTART.indication primitive and a PHY-RXEND.indication primitive.

Referring to FIG. 15, an SIFS time (aSIFSTime) and a slot time (aSlotTime) may be determined according to the physical layer. The SIFS time has a fixed value and a slot time may be dynamically changed according to change in air propagation time (aAirPropagationTime). The SIFS time and the slot time are defined by Equations 1 and 2 below.

$$aSIFSTime = aRxRFDelay + aRxPLCPDelay + aMACProcessingDelay + aRxTxTurnaroundTime \quad \text{Equation 1}$$

$$aSlotTime = aCCATime + aRxTxTurnaroundTime + aAirPropagationTime + aMACProcessingDelay \quad \text{Equation 2}$$

The PIFS and the SIFS are defined by Equations 3 and 4 below.

$$PIFS = aSIFSTime + aSlotTime \quad \text{Equation 3}$$

$$DIFS = aSIFSTime + 2*aSlotTime \quad \text{Equation 4}$$

The EIFS is calculated from the SIFS, the DIFS and the ACK transmission time (ACKTxTime) as shown in Equation 5 below. The ACK transmission time (ACKTxTime) is required to transmit an ACK frame including a preamble, a PLCP header and an additional physical layer-dependent information at a physical layer's lowest mandatory rate in microseconds.

$$EIFS = aSIFSTime + DIFS + ACKTxTime \quad \text{Equation 5}$$

The SIFS, the PIFS and the DIFS shown in FIG. 15 are measured on the medium and different MAC slot boundaries TxSIFS, TxPIFS and TxDIFS. Such a slot boundary is defined as a time for turning a transmitter on by a MAC layer in order to adjust different IFS timings on the medium after detection of CCA result of a previous slot time. The MAC slot boundaries of the SIFS, the PIFS and the DIFS are defined by Equations 6 to 8 below, respectively.

$$TxSIFS = SIFS - aRxTxTurnaroundTime \quad \text{Equation 6}$$

$$TxPIFS = TxSIFS + aSlotTime \quad \text{Equation 7}$$

$$TxDIFS = TxSIFS + 2*aSlotTime \quad \text{Equation 8}$$

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, in a WLAN system, a power management (PM) mode of the STA is supported.

The PM mode of the STA is divided into an active mode and a power save (PS) mode. The STA fundamentally operates in an active mode. The STA which operates in the active mode is maintained in an awake state. The awake state refers to a state in which normal operation such as frame transmission and reception or channel scanning is possible. The STA which operates in the PS mode operates while switching between a sleep state or an awake state. The STA which operates in the sleep state operates with minimum power and does not perform frame transmission and reception and channel scanning.

Since power consumption is reduced as the sleep state of the STA is increased, the operation period of the STA is increased. However, since frame transmission and reception is impossible in the sleep state, the STA may not unconditionally operate in the sleep state. If a frame to be transmitted from the STA, which operates in the sleep state, to the AP is present, the STA may be switched to the awake state to transmit the frame. If a frame to be transmitted from the AP to the STA is present, the STA in the sleep state may not receive the frame and may not confirm that the frame to be received is present. Accordingly, the STA needs to perform an operation for switching to the awake state according to a specific period in order to confirm presence of the frame to be transmitted thereto (to receive the frame if the frame to be transmitted is present).

Figure 16:
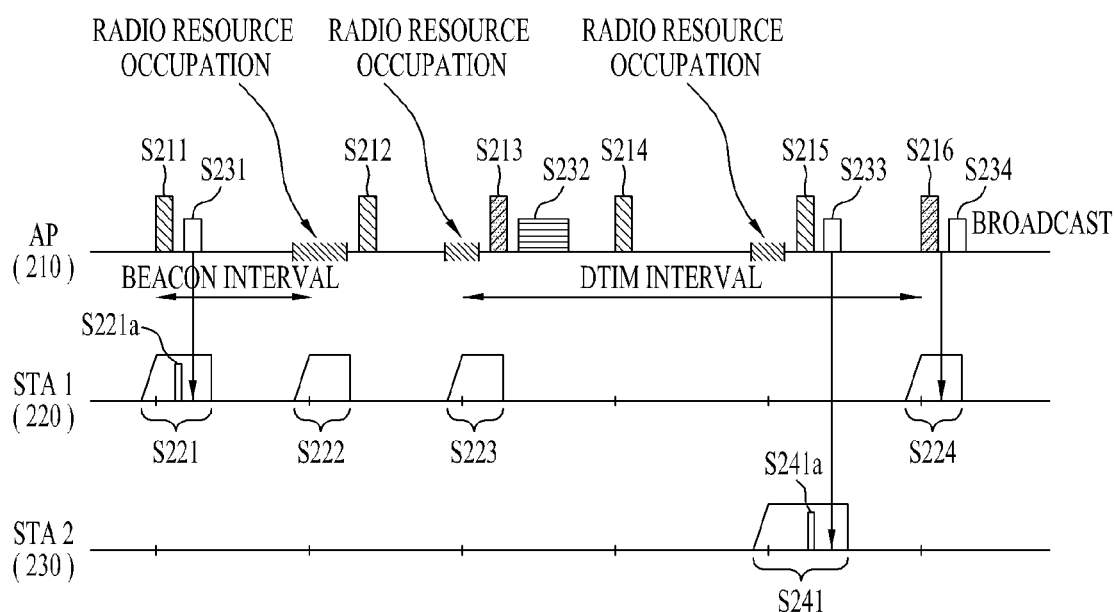
FIG. 16 is a diagram illustrating a power management operation.

FIG. 16 is a diagram illustrating power management operation.

Referring to FIG. 16, an AP 210 transmits beacon frames to STAs within a BSS at a predetermined period (S211, S212, S213, S214, S215 and S216). The beacon frame includes a traffic indication map (TIM) information element. The TIM information element includes information indicating that buffered traffic for STAs associated with the AP 210 is present and the AP 210 will transmit a frame. The TIM element includes a TIM used to indicate a unicast frame or a delivery traffic indication map (DTIM) used to indicate a multicast or broadcast frame.

The AP 210 may transmit the DTIM once whenever the beacon frame is transmitted three times.

An STA1 220 and an STA2 222 operate in the PS mode. The STA1 220 and the STA2 222 may be switched from the sleep state to the awake state at a predetermined wakeup interval to receive a TIM element transmitted by the AP 210. Each STA may compute a time to switch to the awake state based on a local clock thereof. In the example of FIG. 9, assume that the clock of the STA matches the clock of the AP.

For example, the predetermined awake interval may be set such that the STA1 220 is switched to the awake state every beacon interval to receive a TIM element. Accordingly, the STA1 220 may be switched to the awake state (S211) when the AP 210 first transmits the beacon frame (S211). The STA1 220 may receive the beacon frame and acquire the TIM element. If the acquired TIM element indicates that a frame to be transmitted to the STA1 220 is present, the STA1 220 may transmit, to the AP 210, a power save-Poll (PS-Poll) frame for requesting frame transmission from the AP 210 (S221a). The AP 210 may transmit the frame to the STA1 220 in correspondence with the PS-Poll frame (S231). The STA1 220 which has completed frame reception is switched to the sleep state.

When the AP 210 secondly transmits the beacon frame, since another device access the medium and thus the medium is busy, the AP 210 may not transmit the beacon frame at an accurate beacon interval and may transmit the beacon frame at a delayed time (S212). In this case, the operation mode of the STA1 220 is switched to the awake state according to the beacon interval but the delayed beacon frame is not received. Therefore, the operation mode of the STA1 220 is switched to the sleep state again (S222).

When the AP 210 thirdly transmits the beacon frame, the beacon frame may include a TIM element set to a DTIM. Since the medium is busy, the AP 210 transmits the beacon frame at a delayed time (S213). The STA1 220 is switched to the awake state according to the beacon interval and may acquire the DTIM via the beacon frame transmitted by the AP 210. Assume that the DTIM acquired by the STA1 220 indicates that a frame to be transmitted to the STA1 220 is not present and a frame for another STA is present. In this case, the STA1 220 may confirm that a frame transmitted thereby is not present and may be switched to the sleep state again. The AP 210 transmits the beacon frame and then transmits the frame to the STA (S232).

The AP 210 fourthly transmits the beacon frame (S214). Since the STA1 220 cannot acquire information indicating that buffered traffic therefor is present via reception of the TIM element twice, the wakeup interval for receiving the TIM element may be controlled. Alternatively, if signaling information for controlling the wakeup interval of the STA1 220 is included in the beacon frame transmitted by the AP 210, the wakeup interval value of the STA1 220 may be controlled. In the present example, the STA1 220 may change switching of the operation state for receiving the TIM element every beacon interval to switching of the operation state every three beacon intervals. Accordingly, since the STA1 220 is maintained in the sleep state when the AP 210 transmits the fourth beacon frame (S214) and transmits the fifth beacon frame (S215), the TIM element cannot be acquired.

When the AP 210 sixthly transmits the beacon frame (S216), the STA1 220 may be switched to the awake state to acquire the TIM element included in the beacon frame (S224). Since the TIM element is a DTIM indicating that a broadcast frame is present, the STA1 220 may not transmit the PS-Poll frame to the AP 210 but may receive a broadcast frame transmitted by the AP 210 (S234). The wakeup interval set in the STA2 230 may be set to be greater than that of the STA1 220. Accordingly, the STA2 230 may be switched to the awake state to receive the TIM element (S241), when the AP 210 fifthly transmits the beacon frame (S215). The STA2 230 may confirm that a frame to be transmitted thereto is present via the TIM element and transmits the PS-Poll frame to the AP 210 (S241a) in order to request frame transmission. The AP 210 may transmit the frame to the STA2 230 in correspondence with the PS-Poll frame (S233).

For PM management shown in FIG. 16, a TIM element includes a TIM indicating whether a frame to be transmitted to an STA is present and a DTIM indicating whether a broadcast/multicast frame is present. The DTIM may be implemented by setting a field of the TIM element.

Figure 17:
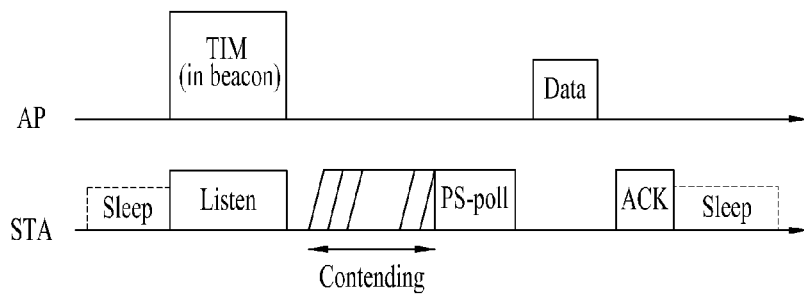
FIGS. 17 to 19 are diagrams illustrating operation of a station (STA) which receives a traffic indication map (TIM)
Figure 18:
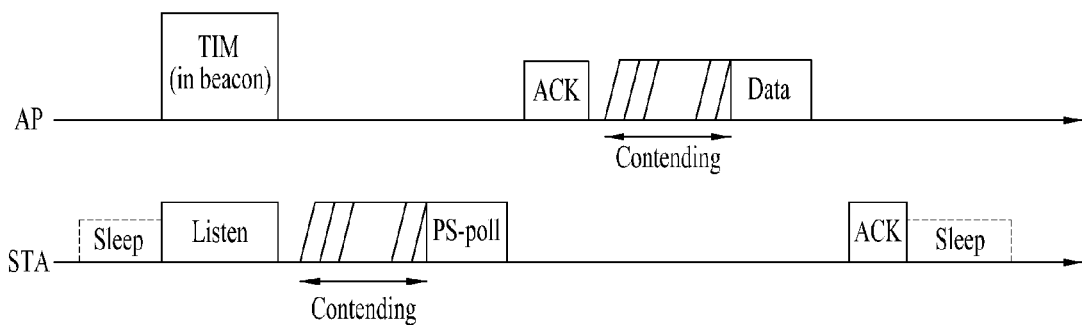
Figure 19:
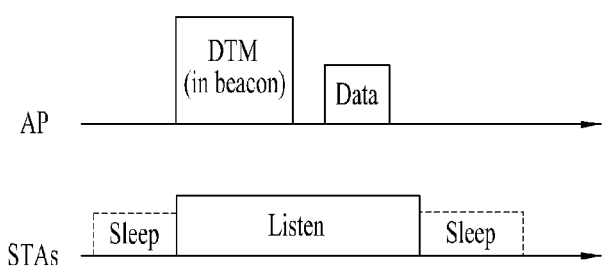

FIGS. 17 to 19 are diagrams illustrating operation of a station (STA) which receives a traffic indication map (TIM).

Referring to FIG. 17, an STA may be switched from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP, which has received the PS-Poll frame transmitted by the STA, may transmit the frame to the STA. The STA may receive the data frame and transmit an ACK frame to the AP. Thereafter, the STA may be switched to the sleep state again.

As shown in FIG. 17, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 18.

In the example of FIG. 18, operation for switching the STA from the sleep state to the awake state, receiving a TIM from the AP, contending and transmitting a PS-Poll frame to the AP is equal to that of FIG. 10. If the data frame is not prepared during the SIFS even when the AP receives the PS-Poll frame, the data frame is not transmitted but an ACK frame may be transmitted to the STA. If the data frame is prepared after transmitting the ACK frame, the AP may contend and transmit the data frame to the STA. The STA may transmit the ACK frame indicating that the data frame has been successfully received to the AP and may be switched to the sleep state.

FIG. 19 shows an example in which the AP transmits the DTIM. The STAs may be switched from the sleep state to the awake state in order to receive the beacon frame including the DTIM element from the AP. The STA may confirm that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may be switched to the sleep state again after completing data reception.

TIM Structure

In the PM mode management method based on the TIM (or DTIM) protocol described with reference to FIGS. 16 to 19, the STAs may confirm whether a data frame to be transmitted thereto is present via STA identification included in the TIM element. The STA identification may be related to an association identifier (AID) assigned to the STA upon association with the AP.

The AID is used as a unique identifier for each STA within one BSS. For example, in a current WLAN system, the AID may be one of values of 1 to 2007. In a currently defined WLAN system, 14 bits are assigned to the AID in a frame transmitted by the AP and/or the STA. Although up to 16383 may be assigned as the AID value, 2008 to 16383 may be reserved.

The TIM element according to an existing definition is not appropriately applied to an M2M application in which a large number (e.g., more than 2007) of STAs is associated with one AP. If the existing TIM structure extends without change, the size of the TIM bitmap is too large to be supported in an existing frame format and to be suitable for M2M communication considering an application with a low transfer rate. In addition, in M2M communication, it is predicted that the number of STAs, in which a reception data frame is present during one beacon period, is very small. Accordingly, in M2M communication, since the size of the TIM bitmap is increased but most bits have a value of 0, there is a need for technology for efficiently compressing the bitmap.

As an existing bitmap compression technology, a method of omitting 0 which continuously appears at a front part of a bitmap and defining an offset (or a start point) is provided. However, if the number of STAs in which a buffered frame is present is small but a difference between the AID values of the STAs is large, compression efficiency is bad. For example, if only frames to be transmitted to only two STAs respectively having AID values of 10 and 2000 are buffered, the length of the compressed bitmap is 1990 but all bits other than both ends have a value of 0. If the number of STAs which may be associated with one AP is small, bitmap compression inefficiency is not problematic but, if the number of STAs is increased, bitmap compression inefficiency deteriorates overall system performance.

As a method of solving this problem, AIDs may be divided into several groups to more efficiently perform data transmission. A specific group ID (GID) is assigned to each group. AIDs assigned based on the group will be described with reference to FIG. 20.

FIG. 20(a) shows an example of AIDs assigned based on a group. In the example of FIG. 20(a), several bits of a front part of the AID bitmap may be used to indicate the GID. For example, four GIDs may be expressed by the first two bits of the AID of the AID bitmap. If the total length of the AID bitmap is N bits, the first two bits (B1 and B2) indicate the GID of the AID.

FIG. 20(a) shows another example of AIDs assigned based on a group. In the example of FIG. 20(b), the GID may be assigned according to the location of the AID. At this time, the AIDs using the same GID may be expressed by an offset and a length value. For example, if GID 1 is expressed by an offset A and a length B, this means that AIDs of A to A+B−1 on the bitmap have GID 1. For example, in the example of FIG. 13(b), assume that all AIDs of 1 to N4 are divided into four groups. In this case, AIDs belonging to GID 1 are 1 to N1 and may be expressed by an offset 1 and a length N1. AIDs belonging to GID 2 may be expressed by an offset N1+1 and a length N2−N1+1, AIDs belonging to GID 3 may be expressed by an offset N2+1 and a length N3−N2+1, and AIDs belonging to GID 4 may be expressed by an offset N3+1 and a length N4−N3+1.

If the AIDs assigned based on the group are introduced, channel access is allowed at a time interval which is changed according to the GID to solve lack of TIM elements for a large number of STAs and to efficiently perform data transmission and reception. For example, only channel access of STA(s) corresponding to a specific group may be granted during a specific time interval and channel access of the remaining STA(s) may be restricted. A predetermined time interval at which only access of specific STA(s) is granted may also be referred to as a restricted access window (RAW).

Channel access according to GID will be described with reference to FIG. 20(c). FIG. 20(c) shows a channel access mechanism according to a beacon interval if the AIDs are divided into three groups. At a first beacon interval (or a first RAW), channel access of STAs belonging to GID 1 is granted but channel access of STAs belonging to other GIDs is not granted. For such implementation, the first beacon includes a TIM element for AIDs corresponding to GID 1. A second beacon frame includes a TIM element for AIDs corresponding to GID 2 and thus only channel access of the STAs corresponding to the AIDs belonging to GID 2 is granted during the second beacon interval (or the second RAW). A third beacon frame includes a TIM element for AIDs corresponding to GID 3 and thus only channel access of the STAs corresponding to the AIDs belonging to GID 3 is granted during the third beacon interval (or the third RAW). A fourth beacon frame includes a TIM element for AIDs corresponding to GID 1 and thus only channel access of the STAs corresponding to the AIDs belonging to GID 1 is granted during the fourth beacon interval (or the fourth RAW). Only channel access of the STAs corresponding to a specific group indicated by the TIM included in the beacon frame may be granted even in fifth and subsequent beacon intervals (or fifth and subsequent RAWs).

Although the order of GIDs allowed according to the beacon interval is cyclic or periodic in FIG. 20(c), the present invention is not limited thereto. That is, by including only AID(s) belonging to specific GID(s) in the TIM elements, only channel access of STA(s) corresponding to the specific AID(s) may be granted during a specific time interval (e.g., a specific RAW) and channel access of the remaining STA(s) may not be granted.

Figure 20:
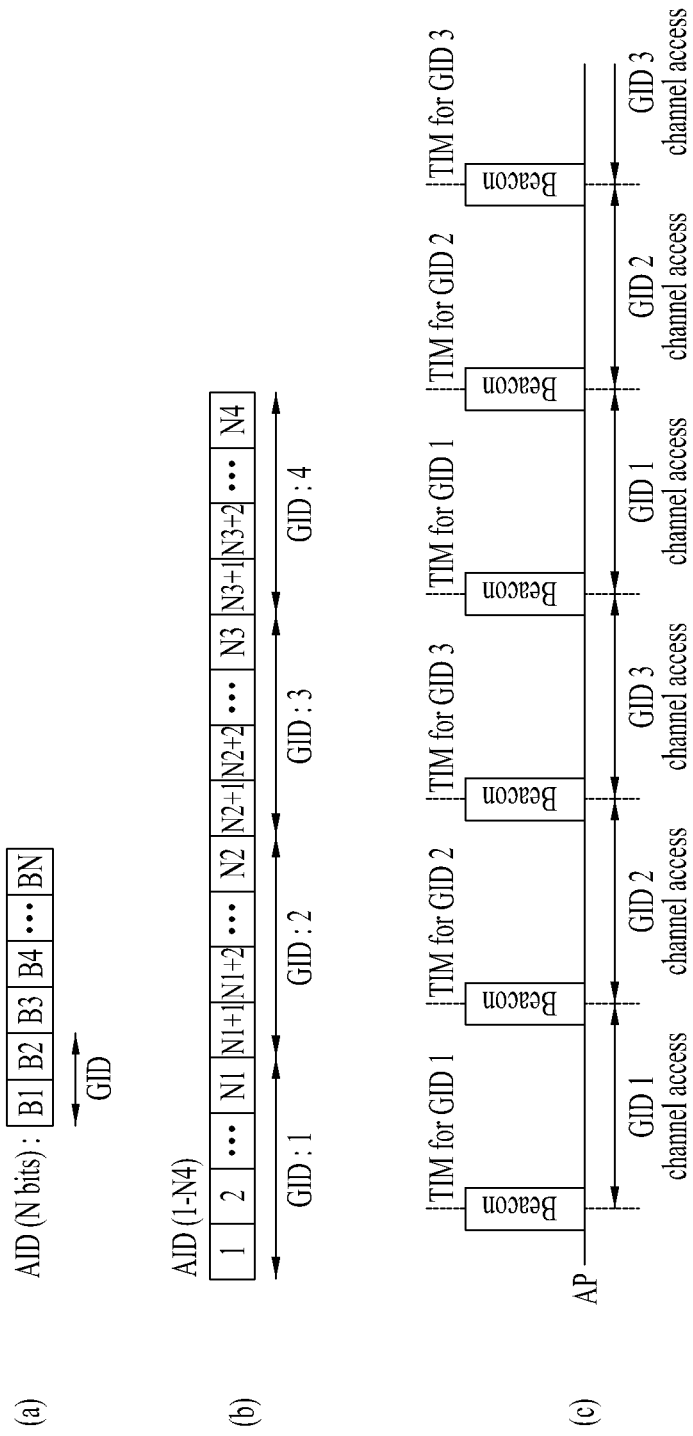
FIG. 20 is a diagram illustrating a group based association identifier (AID)

The above-described group based AID assignment method may also be referred to as a hierarchical structure of a TIM. That is, an entire AID space may be divided into a plurality of blocks and only channel access of STA(s) corresponding to a specific block having a non-zero value (that is, STAs of a specific group) may be granted. A TIM having a large size is divided into small blocks/groups such that the STA easily maintains TIM information and easily manages blocks/groups according to class, QoS or usage of the STA. Although a 2-level layer is shown in the example of FIG. 20, a TIM of a hierarchical structure having two or more levels may be constructed. For example, the entire AID space may be divided into a plurality of page groups, each page group may be divided into a plurality of blocks, and each block may be divided into a plurality of sub-blocks. In this case, as an extension of the example of FIG. 20(a), the first N1 bits of the AID bitmap indicate a paging ID (that is, a PID), the next N2 bits indicate a block ID, the next N3 bits indicate a sub-block ID, and the remaining bits indicate the STA bit location in the sub-block.

Fields/Elements of Power Management

The fields/elements related to the above-described power management include a listen interval field, a BSS max idle period element, etc., which will be described with reference to FIGS. 21 to 22.

FIG. 21 is a diagram illustrating a listen interval.

A listen interval field indicates to an AP how often an STA in a power saving mode wakes up in order to listen to a beacon frame. In case of a non-TIM STA, a listen interval field indicates, to an AP, a period that an STA transmits a PS-Poll frame or a trigger frame. The STA, which has transmitted the PS-Poll frame or the trigger frame according to the listen interval, may receive ACK or DATA from the non-TIM AP. More specifically, when the AP receives the PS-Poll frame from the non-TIM STA, if the STA has buffered data, ACK or DATA is transmitted to the STA. If the STA does not have buffered data, ACK including information indicating that the buffered data is not present may be transmitted. The value of the listen interval field is a listen interval parameter of an MLME-ASSOCIATE request or an MLME-REASSOCIATE request. The basic unit of the listen interval field is a beacon interval and the length thereof is 2 octets.

FIG. 22 is a diagram illustrating a BSS max idle period.

The BSS max idle period element includes a time interval/period for refraining frame transmission while an STA maintains an association state with an AP. Referring to FIG. 22, an Element ID field indicates a BSS max idle period value and the value of a Length field is 3. The Max Idle Period field indicates a time interval/period for refraining frame transmission while an STA maintains an association state with an AP. An Idle Options field indicates idle options associated with BSS idle capabilities.

The BSS max idle period is applicable to sensor type apparatuses which operate with a very long duty cycle and low power. Since the battery life of the sensor type apparatuses may be maximally several years, the BSS max idle period should be several years. According to the above-described BSS max idle period element, the Max Idle Period has 2 octets and 16 bits and the basic unit thereof is 1000 TU (1024 ms) and thus a maximum value thereof is 18.64 Hr. Since this value is a relatively short value for the above-described sensor type apparatuses, a max idle period supporting a value greater than this value is necessary.

The basic unit of the BSS max idle period may be increased from 1000 TU to 10000 TU, etc. In this case, the AP and the STA need to negotiate for increase in basic unit in advance and increase in basic unit needs to be coincident with the listen interval set by the STA. If the listen interval is not considered while the BSS max idle period is increased, although the STA does not need to transmit and receive frames according to the increased BSS max idle period, the STA wakes up in order to receive a beacon frame at a listen interval shorter than the BSS max idle period and thus power saving is not achieved.

In addition, since the BSS max idle period is transmitted via an association response frame and the listen interval is transmitted via an association response frame, when the STA actually sets a listen interval value, the BSS max idle period cannot be used. Thus, it is difficult to enable increase in BSS max idle period to coincide with increase in listen interval.

Accordingly, in the embodiments of the present invention, methods for increasing the BSS max idle period and the listen interval for an STA which operates with low power during a very long time while solving the above-described problems will now be described.

A scaling factor is applied to the BSS max idle period (a value included in the Max Idle Period field of the BSS max idle period element) to increase the BSS max idle period and is commonly applied to a listen interval (a value included in the listen interval field) and a WNM sleep interval (a value included in a WNM sleep mode element). For STA operation, the non-TIM STA transmits the PS-Poll frame or the trigger frame according to the listen interval. Here, the scaling factor commonly applied to the BSS max idle period and/or the WNM sleep interval may be applied to the listen interval.

That is, in order to support a longer sleep interval, a unified scaling factor is applied to the BSS max idle period, the listen interval and the WNM sleep interval. Here, applying the unified scaling factor to the listen interval means that the value included in the listen interval field is multiplied by the unified scaling factor to calculate the listen interval. For example, if the beacon interval 100 ms, the value included in the listen interval field is 000 . . . 001 (16 bits, the listen interval before applying the unified scaling factor is 100 ms) and the unified scaling factor is 10, the listen interval becomes 1000 ms. In addition, if the beacon interval 100 ms, the value included in the listen interval field is 111 . . . 111 (16 bits, the listen interval before applying the unified scaling factor is 1.82 Hr) and the unified scaling factor is 10, the listen interval after applying the unified scaling factor becomes 18.2 hr. In addition, if the beacon interval is 1 s and the value included in the listen interval field is 000 . . . 001 (16 bits, the listen interval before applying the unified scaling factor is 1000 ms), the listen interval after applying the unified scaling factor 10 becomes 10 s. In addition, if the beacon interval is 1 s and the value included in the listen interval field is 111 . . . 111 (16 bits, the listen interval before applying the unified scaling factor is 18.2 hr), the listen interval after applying the unified scaling factor 10 becomes 182 hr (7.58 days).

In addition, applying the unified scaling factor to the BSS max idle period and the WNM sleep interval means that the value included in the BSS idle period element is multiplied by the unified scaling factor to calculate the BSS max idle period and the value included in the WNM sleep mode element is multiplied by the unified scaling factor to calculate the BSS max idle period.

The above-described unified scaling factor is a specific value (hereinafter, referred to as k), which is applicable to the BSS max idle period, the listen interval and the WNM sleep interval and is applicable along with a basic unit extension factor (hereinafter, referred to as extended_k) as described below. Here, extended_k means actual k values respectively applied to the BSS max idle period, the listen interval and the WNM sleep interval. In other words, the STA/AP may differently interpret the scaling factor k to map different extended_k.

Extended_k=k may be interpreted/used/mapped in a BSS max idle period, the basic unit of which is 1000 TU, extended_k=(k/BI)*1000 TU may be interpreted/used/mapped in a listen interval, the basic unit of which is a beacon interval BI and extended_k=(k/DI)*1000 TU may be interpreted/used/mapped in a WNM sleep interval, the basic unit of which is a DTIM interval (DI).

Detailed examples thereof will now be described. In the following examples, assume that the unified scaling factor k is 10.

First, if the unified scaling factor is applied to the BSS max idle period, 1000 TU*10=10000 TU and thus a maximally supportable BSS max idle period value becomes 10000 TU*(65535/3600)=186.4 hrs=7.76 days.

Next, if the unified scaling factor is applied to the listen interval on the assumption of BI=1 s, 1 s*(10/10 s)*1000 TU=10000 TU. Accordingly, a maximally supportable listen interval becomes 10000 TU*(65525/3600)=186.4 hrs=7.76 days. The same result is obtained even when BI is 0.1 s. Here, 1000 TU is multiplied, for alignment with the BSS max idle period in terms of power saving. That is, 1000 TU is multiplied because the basic unit of the BSS max idle period is not 1 s but is 1.024 s (1000 TU). If accurate alignment is not necessary, multiplying of 1000 TU may be omitted (e.g., extended_k=(k/BI)*1 s).

In addition, if the unified scaling factor is applied to the WNM sleep interval on the assumption that DI is 10 s, 10 s*(10/10 s)*1000 TU=10000 TU. Accordingly, the maximally supportable WNM sleep interval becomes 7.76 days. The same result is obtained even when DI is 1 s.

By applying the basic unit extension factor along with the unified scaling factor, the BSS max idle period, the listen interval and the WNM sleep interval may be aligned. Table 2 below shows values applied to the BSS max idle period, the listen interval and the WNM sleep interval if the unified scaling factor is applied and the unified scaling factor and the basic unit extension factor are applied.

TABLE 2

|  | Unified scaling factor/(unified value: extension factor negotiated b/w AP and STA) | Basic unit extension factor: actual extension factor multiplied by the unit of each interval |
|---|---|---|
| Max Idle Period | K | K |
| Listen Interval | k | (k/BI) * 1000 TU |
| WNM sleep interval | k | (k/DI) * 1000 TU |

The above-described unified scaling factor information and parameter should be negotiated between the STA and the AP in advance, may be implicitly (or automatically) set according to the BSS max idle period value set between the AP and the STA, and may be defined as a control field separately from the BSS max idle period value to be explicitly transmitted. In addition, since the STA sets the listen interval in an association request frame, the BSS max idle period and the listen interval may be coincident with each other by the following three settings/operations.

First, a probe request/response procedure may be used. The STA may transmit a device type thereof, a preferred BSS max idle period information and/or the above-described parameter information to the AP via a probe request frame and the AP may transmit BSS max idle period information and/or the above-described parameter information to the STA via a probe response frame. The STA can check a listen interval setting and management method based on this information.

Second, a reassociation request/response procedure may be used. An STA which does not perform a probe request/response procedure may re-set a listen interval based on max idle period field information and/or parameter information of a request/response frame transmitted by an AP and transmit the listen interval to the AP via a reassociation request frame.

Third, if the AP transmits max idle period field information and/or parameter information to the STA via a beacon, the STA receives a full beacon signal, checks the max idle period field information transmitted by the AP, and sets a listen interval, before transmitting an association request frame carrying listen interval information.

Although the above-described methods are commonly applicable to all types of STAs, the above-described methods are differently applicable according to STA or device type of the STA. Accordingly, the above-described methods are differently applicable according to STA or device type of the STA in advance by a capability negotiation procedure of the AP and the STA. That is, the STA may apply extension of the BSS max idle period, the listen interval and the WNM sleep interval via various capability negotiation frames/fields such as a capability negotiation request/response frame with the AP, a QoS capability element, a QoS control field, etc.

In such a capability negotiation procedure, a capability field shown in Tables 3 to 5 may be used. Hereinafter, for other contents omitted in the capability field of Tables 3 to 5 below, refer to "IEEE Std 802.11-2012, 8.4.2.29 Extended Capabilities element".

TABLE 3

| Bit | Information | Notes |
|---|---|---|
| ... | ... | ... |
| 49 | Sleep Interval Granularity (k) | Sleep Interval Granularity subfield indicates the scaling factor to be multiplied to the unit of the max idle period, listen interval, and WNM-Sleep interval. Number of beacon of the shortest Listen interval Set to 1 Set to 10 Set to 100 Set to 1000 |
| 50-n | Reserved |  |

Table 3 above shows the configuration of the capability field for the negotiation procedure between the AP and the STA for the unified scaling factor (k; in Table 3, a sleep interval granularity is described as another expression of k) applied to the BSS max idle period, the listen interval and the WNM sleep interval.

TABLE 4

| Bit | Information | Notes |
|---|---|---|
| ... | ... | ... |
| 49 | Granularity of the max idle period and Listen Interval | Scaling factor to be multiplied to the time period of the max idle period and the number of beacon frame of the shortest Listen interval, respectively This field is defined when the max idle |

TABLE 4-continued

| Bit | Information | Notes |
|---|---|---|
| | | period and Listen interval are extended; otherwise, it is reserved. Set to 10 (10000 TU of time unit of the max idle period, 10 beacon frames of the shortest Listen interval) Set to 100 (100000 TU of time unit of the max idle period, 100 beacon frames of the shortest Listen interval) |
| 50-n | Reserved | |

Table 4 above shows the configuration of the capability field for the negotiation procedure between the AP and the STA for the unified scaling factor for the maximum idle period and the listen interval.

TABLE 5

| Bit | Information | Notes |
|---|---|---|
| ... | ... | ... |
| 49 | Listen interval granularity | Number of beacon of the shortest Listen interval This field is defined when the time period in the BSS max idle period (8.4.2.81) is extended to larger than 1000 TU; otherwise, it is reserved. Set to 10 beacons when the time period is extended to 10000 TU Set to 100 beacons when time period is extended to 100000 TU |
| 50-n | Reserved | |

Table 5 above shows the configuration of the capability field for the negotiation procedure between the AP and the STA related to extension of the listen interval on the assumption that a max idle period is already set.

Figure 23:
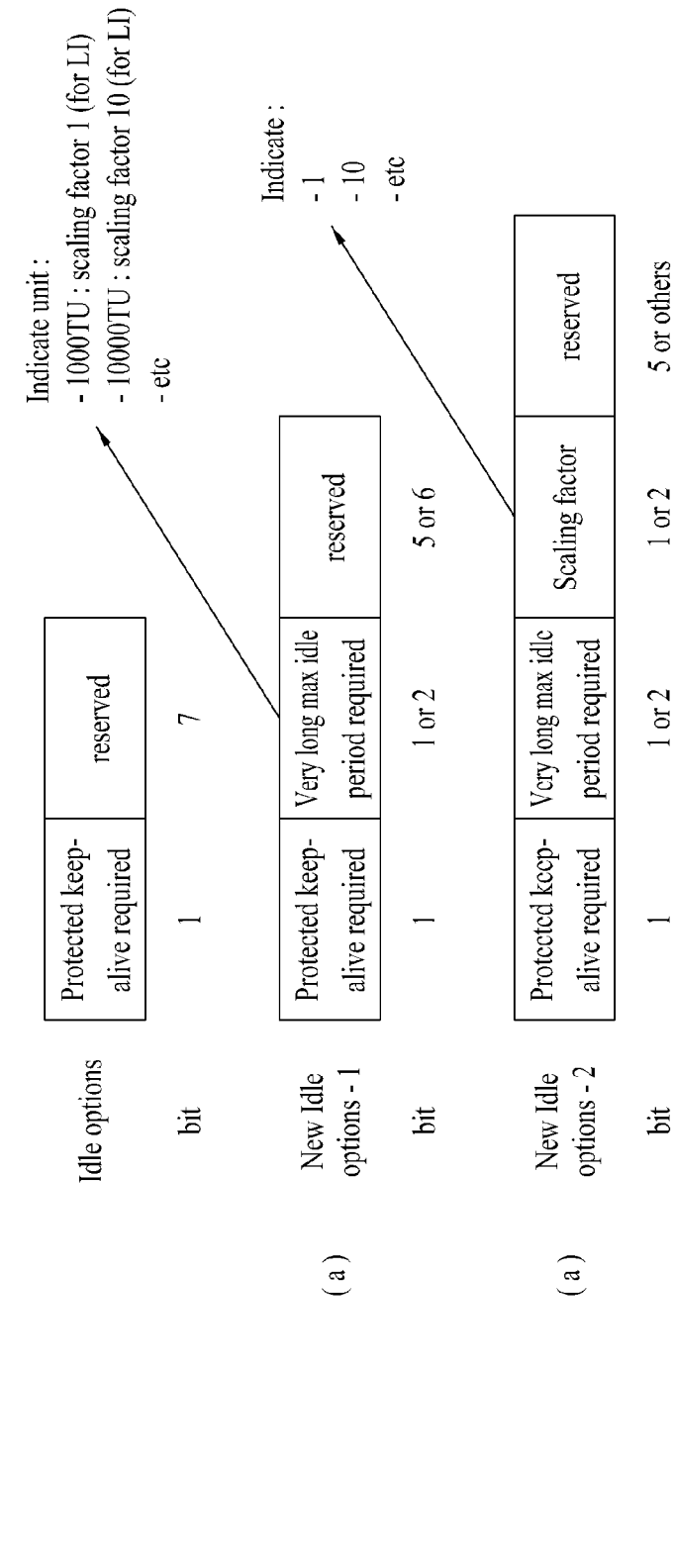
FIG. 23 is a diagram illustrating one embodiment of the present invention.

FIG. 23 shows an example in which a unified scaling factor is indicated via a BSS max idle period element if the above-described unified scaling factor is applied. FIG. 23(a) shows an example in which a unified scaling factor is indicated by a very long max idle period required field which is a sub-field of an idle options field of a BSS max idle period element. The very long max idle period required field has 1 or 2 bits and may indicate a unified scaling factor 1 or 10 as shown. In addition, FIG. 23(b) shows the case in which a unified scaling factor is indicated by a scaling factor field which is a sub-field of an idle options field of a BSS max idle period element. In this case, as shown, the value of the unified scaling factor has 1 or 2 bits and may be 1 or 10. The embodiment of the present invention is not limited to FIG. 23 and may be indicated via another field (max idle period field) of the BSS max idle period element, for example.

Although the scaling factor is used as the method for increasing the sleep interval in the above description, a method for increasing the size of the listen interval field to 3 octets may be used.

Figure 24:
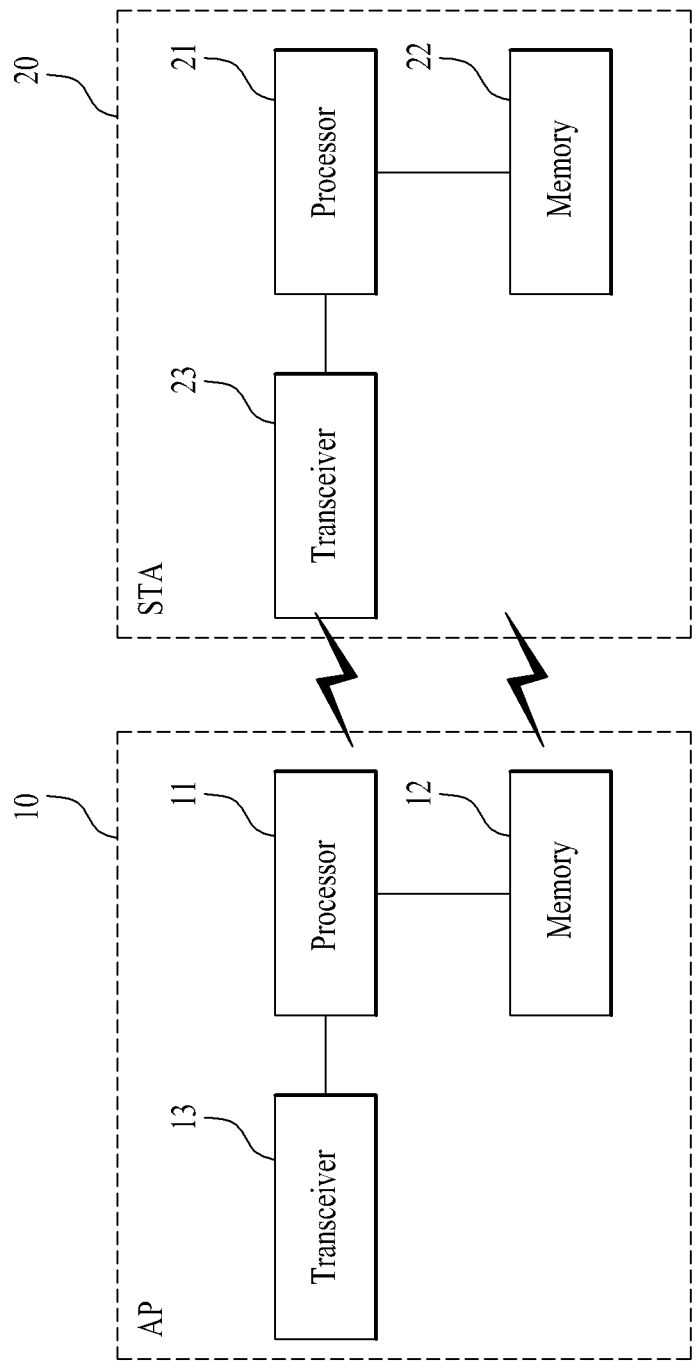
FIG. 24 is a block diagram showing the configuration of a wireless apparatus according to one embodiment of the present invention.

FIG. 24 is a block diagram showing the configuration of a wireless apparatus according to one embodiment of the present invention.

The AP 10 may include a processor 11, a memory 12 and a transceiver 13. The STA 20 may include a processor 21, a memory 22 and a transceiver 23. The transceivers 13 and 23 may transmit/receive a radio frequency (RF) signal and implement a physical layer according to an IEEE 802 system, for example. The processors 11 and 21 may be respectively connected to the transceivers 13 and 21 to implement a physical layer and/or a MAC layer according to the IEEE 802 system. The processors 11 and 21 may be configured to perform operations according to the above-described various embodiments of the present invention. In addition, modules implementing operations of the AP and the STA according to the above-described embodiments of the present invention may be stored in the memories 12 and 22 and may be executed by the processors 11 and 21, respectively. The memories 12 and 22 may be mounted inside or outside the processors 11 and 21 to be connected to the processors 11 and 21 by known means, respectively.

The detailed configuration of the AP and the STA apparatus may be implemented such that details described in the above embodiments of the present invention is independently applied or two or more embodiments are simultaneously applied. In this case, overlapping details will be omitted from the description for clarity.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the above-described various embodiments of the present invention are applied to the IEEE 802.11 system, the embodiments of the present invention are applicable to various radio access systems.

The invention claimed is:
1. A method for transmitting a signal of a station (STA) operable in a power saving mode in a wireless communication system, the method comprising:
   determining a first time period by applying a scaling factor to a first time interval related to the power saving mode, and
   transmitting at least one of a PS-Poll frame and a trigger frame according to the determined first time period, wherein the scaling factor applied to the first time interval is commonly applied to a second time interval and a third time interval related to the power saving mode, when the STA determines a second time period from the second time interval and a third time period from the third time interval.

2. The method according to claim 1, wherein the first time period is used to indicate a duration during which the STA is required to transmit at least one of the PS-Poll frame or the trigger frame, the second time period is related to whether to refrain from frame transmission while the STA maintains an association state with an access point (AP) and the third time period is related to how often the STA in a wireless network management (WNM) sleep mode wakes up to receive a beacon frame.

3. The method according to claim 2, wherein the first time period is a listen interval and the second time period is a basic service set (BSS) max idle period and the third time period is a WNM sleep interval.

4. The method according to claim 3, wherein the scaling factor is applied by multiplying a value included in a listen interval field, a value included in a BSS max idle period element and a value included in a WNM sleep mode element by the scaling factor.

5. The method according to claim 3, wherein the STA multiplies a basic unit extension factor when applying the scaling factor to a value included in a listen interval field, a value included in a BSS max idle period element and a value included in a WNM sleep mode element.

6. The method according to claim 5, wherein the basic unit extension factor is 1000 TU/BI when the scaling factor is applied to the value included in the listen interval field, is 1 when the scaling factor is applied to the value included in the BSS max idle period element, and is 1000 TU/DI if the scaling factor is applied to the value included in the WNM sleep mode element, where TU is 1024 μs, BI is a beacon interval and DI is a delivery traffic indication message (DTIM) interval.

7. The method according to claim 6, wherein a basic unit of the value included in the listen interval field is BI, a basic unit of the value included in the BSS max idle period element is 1000 TU and a basic unit of the value included in the WNM sleep mode element is DI.

8. The method according to claim 3, wherein the listen interval is determined based on a BSS max idle period included in a probe response frame received from the AP.

9. The method according to claim 8, wherein the probe response frame is a response to a probe request frame including preference related to the BSS max idle period of the STA and the scaling factor.

10. The method according to claim 3, wherein the STA transmits the listen interval to the AP via a reassociation request frame.

11. The method according to claim 10, wherein the listen interval is determined based on a BSS max idle period included in an association response frame received from the AP.

12. The method according to claim 3, wherein the listen interval is determined based on a BSS max idle period included in a beacon frame received from the AP.

13. The method according to claim 12, wherein the STA determines the listen interval after receiving a beacon frame including the BSS max idle period.

* * * * *